(12) United States Patent
McIntosh

(10) Patent No.: US 8,944,377 B2
(45) Date of Patent: Feb. 3, 2015

(54) LAVATORY RECONFIGURATION SYSTEM

(71) Applicant: The Boeing Company, Chicago, IL (US)

(72) Inventor: Darren Carl McIntosh, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/915,031

(22) Filed: Jun. 11, 2013

(65) Prior Publication Data
US 2014/0360099 A1   Dec. 11, 2014

(51) Int. Cl.
*B64D 11/02* (2006.01)
*E03D 11/00* (2006.01)
*E06B 7/28* (2006.01)

(52) U.S. Cl.
CPC .. *E03D 11/00* (2013.01); *E06B 7/28* (2013.01)
USPC .................... 244/118.5; 244/118.2

(58) Field of Classification Search
CPC ....... B64D 11/02; B64D 11/04; B64C 1/1469
USPC ............... 160/210, 212, 218, 220; 244/118.5, 244/118.2, 129.4, 129.5; 52/64, 65, 71; 4/661, 449
See application file for complete search history.

(56) References Cited

U.S. PATENT DOCUMENTS

| | | | |
|---|---|---|---|
| 3,541,750 A * | 11/1970 | Ritter ................................ | 52/65 |
| 3,862,525 A * | 1/1975 | Greenspan ........................ | 52/64 |
| 4,100,857 A | 7/1978 | Gutridge et al. | |
| 4,589,463 A * | 5/1986 | Ryan .............................. | 160/88 |
| 4,672,772 A | 6/1987 | Nakamura | |
| 5,573,053 A | 11/1996 | Hanemaayer | |
| 6,007,025 A | 12/1999 | Coughren et al. | |
| 6,079,669 A | 6/2000 | Hanay et al. | |
| 6,186,444 B1 | 2/2001 | Steel | |
| 6,257,523 B1 * | 7/2001 | Olliges ...................... | 244/118.5 |
| 6,604,709 B1 * | 8/2003 | Wentland et al. .......... | 244/118.5 |
| 6,615,421 B2 | 9/2003 | Itakura | |

(Continued)

FOREIGN PATENT DOCUMENTS

DE   102011011704 A1   12/2012
WO   WO03064790 A1   8/2003

(Continued)

OTHER PUBLICATIONS

Lavatory Accessibility in Single-Aisle Aircraft, Final Report of the Aircraft Accessibility Federal Advisory Committee, Office of Environment, Energy, and Safety, U.S. Department of Transportation, Apr. 1993, 61 Pages, accessed Aug. 30, 2012 ntl.bts.gov/lib/22000/22900/22931/lavacces.pdf.

(Continued)

*Primary Examiner* — Jeanette E Chapman
*Assistant Examiner* — Daniel Kenny
(74) *Attorney, Agent, or Firm* — Yee & Associates, P.C.

(57) ABSTRACT

A method and apparatus for reconfiguring a lavatory area. An apparatus comprises a first lavatory area, a second lavatory area, a first door for the first lavatory area, and a second door for the second lavatory area. The first door and the second door are configured to move between an open position and a closed position. A single passageway is present in both the first lavatory area and the second lavatory area when the first door and the second door are in the open position.

15 Claims, 20 Drawing Sheets

(56) References Cited

U.S. PATENT DOCUMENTS

| | | |
|---|---|---|
| 6,889,936 B1 | 5/2005 | Pho et al. |
| 7,152,257 B2 * | 12/2006 | Lasch et al. .............. 4/661 |
| 7,165,595 B2 | 1/2007 | Yamamoto |
| 7,222,820 B2 | 5/2007 | Wentland et al. |
| 7,364,119 B2 * | 4/2008 | Sprenger et al. ........... 244/118.6 |
| 7,721,990 B2 | 5/2010 | Jaeger et al. |
| 7,823,834 B2 | 11/2010 | French et al. |
| 7,866,603 B2 | 1/2011 | Cooper et al. |
| 7,950,439 B2 | 5/2011 | Anderson |
| 7,984,875 B2 | 7/2011 | Koehn et al. |
| 8,517,307 B2 | 8/2013 | Saint-Jalmes et al. |
| 8,621,787 B2 | 1/2014 | Barry et al. |
| 8,672,267 B2 * | 3/2014 | Schliwa et al. ............ 244/118.6 |
| 8,720,827 B2 | 5/2014 | Boren et al. |
| 2003/0066931 A1 | 4/2003 | Ward |
| 2004/0173327 A1 | 9/2004 | Steel et al. |
| 2004/0227034 A1 | 11/2004 | Wentland et al. |
| 2005/0116098 A1 | 6/2005 | Martens et al. |
| 2005/0116099 A1 * | 6/2005 | Pho et al. .................. 244/118.5 |
| 2005/0241062 A1 | 11/2005 | Quan |
| 2006/0169839 A1 | 8/2006 | French et al. |
| 2007/0119548 A1 | 5/2007 | Anderson |
| 2009/0065641 A1 | 3/2009 | Koehn et al. |
| 2010/0237193 A1 | 9/2010 | Yoshizaki |
| 2012/0261509 A1 | 10/2012 | Grant et al. |
| 2013/0206907 A1 | 8/2013 | Burrows et al. |
| 2014/0077033 A1 | 3/2014 | Scown et al. |
| 2014/0083012 A1 | 3/2014 | Boren et al. |

FOREIGN PATENT DOCUMENTS

| | | |
|---|---|---|
| WO | WO2004076279 A2 | 9/2004 |
| WO | WO2011101385 A2 | 8/2011 |

OTHER PUBLICATIONS

Space-Flex: Innovative cabin option for A320; Cabin configuration adds space for more seats, Noticias Airbus, No. 142, Apr./May 2012, 1 Page, accessed Aug. 30, 2012 http://www.noticiaslatamsales.com/en/editions/detail/AprMay2012/innovations/129/Space-Flex-Innovative-cabin-option-for-A320.

Scown et al., "Lavatory Reconfiguration System," U.S. Appl. No. 13/621,462, filed Sep. 17, 2012, 46 pages.

Boren, "Dual Function Lavatory Door," U.S. Appl. No. 13/625,872, filed Sep. 25, 2012, 38 pages.

McIntosh, "Modular Lavatory System," U.S. Appl. No. 14/045,493, filed Oct. 3, 2013, 56 pages.

Notice of Allowance, dated Mar. 3, 2014, regarding U.S. Appl. No. 13/625,872, 10 pages. (2-106(12-0623)).

Office Action, dated Apr. 25, 2014, regarding U.S. Appl. No. 13/621,462, 20 pages.

Final Office Action, dated Aug. 7, 2014, regarding U.S. Appl. No. 13/621,462, 14 pages.

International Search Report and Written Opinion dated Sep. 19, 2014, regarding Application No. PCT/US2014/043682, 11 pages.

Extended European Search Report, dated Nov. 21, 2014, regarding Application No. EP14162310.8, 7 pages.

* cited by examiner

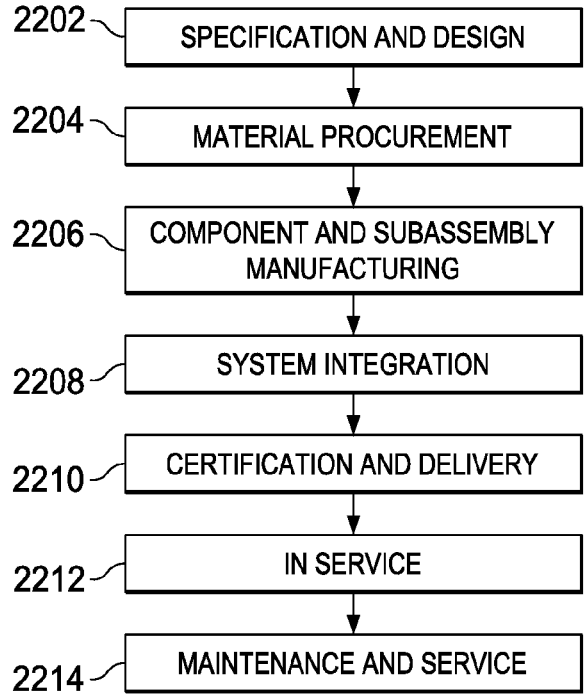
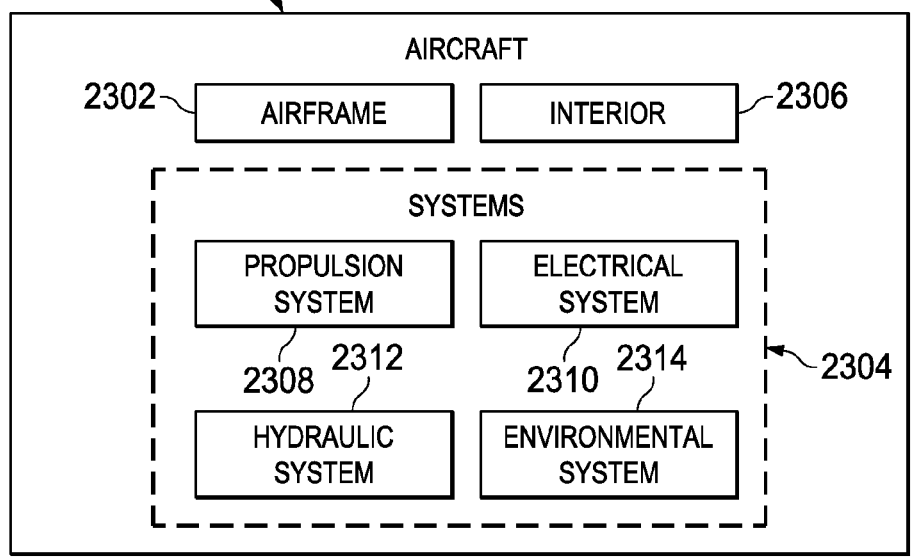

LAVATORY RECONFIGURATION SYSTEM

BACKGROUND INFORMATION

1. Field

The present disclosure relates generally to aircraft and, in particular, to lavatories in aircraft. Still more particularly, the present disclosure relates to providing a desired level of access to lavatories in an aircraft.

2. Background

In designing and manufacturing aircraft, maximizing the amount of space available for passenger seating is an important consideration. In addition to passenger seating, galleys, closets, lavatories, and other areas may take up space in the interior of the aircraft.

With respect to the design of lavatories, handicap access is important. Handicap access includes access for passengers in wheelchairs. Standards for handicap access in an aircraft are often specified through regulations and laws.

In some cases, the lavatories designed for accommodating handicapped passengers require more space than standard lavatories in an aircraft. A lavatory may be redesigned to provide the desired amount of space for access by handicapped passengers.

The redesign may be performed for an aircraft being manufactured or the redesign may be used to refurbish existing aircraft to provide the desired access for handicapped passengers. This redesign may take various forms. For example, the perimeter of the lavatory may be redesigned such that a desired amount of space is present with a desired configuration within the lavatory.

In some cases, the lavatories may be redesigned to extend into space normally used for aisles or other purposes when access by a handicapped passenger is needed. In yet other examples, a more efficient use of space may involve two lavatories being positioned next to each other and reconfigured to provide more access than a single lavatory for a handicapped passenger when needed.

These and other systems have been used to provide additional access for handicapped passengers but may not provide as efficient of a design as desired in an aircraft. For example, lavatories that use additional space in the cabin may be more difficult to reconfigure than desired. These systems also may limit desired access in other areas when a lavatory is reconfigured to use additional space in the cabin.

Also, lavatories that are convertible from two lavatories into a single lavatory also may be more difficult to reconfigure and may not be as efficient as desired. Therefore, it would be desirable to have a method and apparatus that take into account at least some of the issues discussed above, as well as other possible issues.

SUMMARY

In one illustrative embodiment, an apparatus comprises a first lavatory area, a second lavatory area, a first door for the first lavatory area, and a second door for the second lavatory area. The first door and the second door are configured to move between an open position and a closed position. A single passageway is present in both the first lavatory area and the second lavatory area when the first door and the second door are in the open position.

In another illustrative embodiment, a method for reconfiguring lavatories is presented. A first door for a first lavatory area and a second door for a second lavatory area are moved between a closed and an open position. A single passageway is present in both the first lavatory area and the second lavatory area when the first door and the second door are in the open position.

In yet another illustrative embodiment, a method of operating an aircraft is presented. The aircraft in which a first lavatory and a second lavatory are located in the aircraft is operated with a moveable partition configured for use with the first lavatory and the second lavatory. The moveable partition is configured to separate the first lavatory and the second lavatory into separate spaces within a fixed perimeter for the first lavatory and the second lavatory when the moveable partition is in a first configuration. The moveable partition is configured to define a single space within the fixed perimeter when the moveable partition is in a second configuration and in which a first door for the first lavatory and a second door for the second lavatory are configured to open to form an entrance for the single space without a partition between the first door and the second door when the moveable partition is in the second configuration.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 22 is an illustration of an aircraft manufacturing and service method in the form of a block diagram in accordance with an illustrative embodiment; and FIG. 23 is an illustration of an aircraft in the form of a block diagram in which an illustrative embodiment may be implemented.

DETAILED DESCRIPTION

Figure 1:
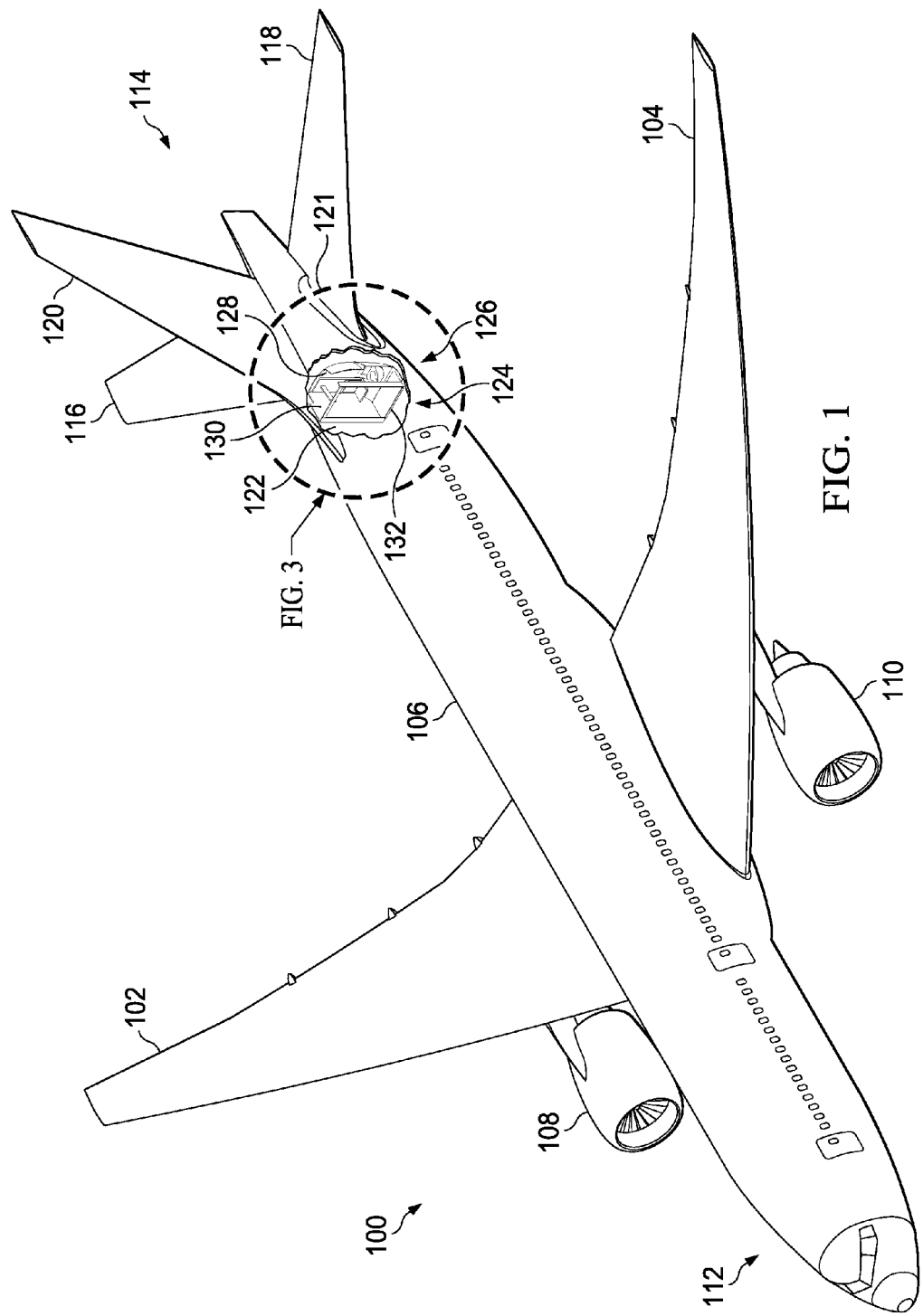
FIG. 1 is an illustration of an aircraft in accordance with an illustrative embodiment.

The illustrative embodiments recognize and take into account one or more different considerations. For example, the illustrative embodiments recognize and take into account that it may be desirable to maintain the same perimeter for a lavatory rather than encroaching on space in the cabin through changing the perimeter of the lavatory.

The illustrative embodiments also recognize and take into account that existing systems that convert two lavatories into a single, larger lavatory for use by passengers who may require more space may be more difficult to reconfigure than desired. Further, these designs also may be less efficient than desired. For example, the illustrative embodiments recognize and take into account that a wall dividing two lavatories may be folded back against an interior wall of the two lavatories to provide additional space for a handicapped passenger. The reconfiguration of a folding wall against an interior wall of the two lavatories may provide this additional space for a handicapped passenger or other passengers needing more space in a lavatory.

The illustrative embodiments also recognize and take into account that currently available lavatories that may be reconfigured are often unable to provide a desired level of access for handicapped passengers or other passengers who may require additional space with an the entrance to the lavatory.

Thus, the illustrative embodiments provide a method and apparatus for reconfiguring a lavatory area in an aircraft. In one illustrative example, a moveable partition for a first lavatory and a second lavatory in the lavatory area is moved between a first configuration and a second configuration. The first configuration separates the first lavatory and the second lavatory into separate spaces within a fixed perimeter for the first lavatory and the second lavatory. The second configuration has a single space present within the fixed perimeter. A first door and a second door move between a closed position and an open position. The first door and the second door are configured to open to form an entrance for the single space without a partition between the first door and the second door when the moveable partition is in the second configuration With reference now to the figures and, in particular, with reference to FIG. 1, an illustration of an aircraft is depicted in accordance with an illustrative embodiment. In this illustrative example, aircraft 100 has wing 102 and wing 104 attached to fuselage 106. Aircraft 100 includes engine 108 attached to wing 102 and engine 110 attached to wing 104.

Fuselage 106 has nose section 112 and tail section 114. Horizontal stabilizer 116, horizontal stabilizer 118, and vertical stabilizer 120 are attached to tail section 114 of fuselage 106.

Aircraft 100 is an example of an aircraft in which a lavatory access system may be implemented in accordance with an illustrative embodiment. As depicted, section 121 illustrates an exposed view in which interior 122 of passenger cabin 124 in fuselage 106 of aircraft 100 is seen. In this illustrative example, section 121 of passenger cabin 124 includes lavatory area 126 as seen in this exposed view.

In this illustrative example, lavatory area 126 includes first lavatory 128 and second lavatory 130. These lavatories are examples of lavatories that may be reconfigured to allow greater access to handicapped passengers in accordance with an illustrative embodiment. In particular, these lavatories may be reconfigured to provide a desired level of access to passengers in aircraft 100. For example, first lavatory 128 and second lavatory 130 may be reconfigured into a single lavatory in lavatory area 126. In this manner, access may be provided to passengers such as those that may desire a greater amount of space, easier access, or some combination thereof. Further, the reconfiguration of these lavatories may occur without changing perimeter 132 for first lavatory 128 and second lavatory 130. In other words, perimeter 132 remains fixed in these illustrative examples.

Figure 2:
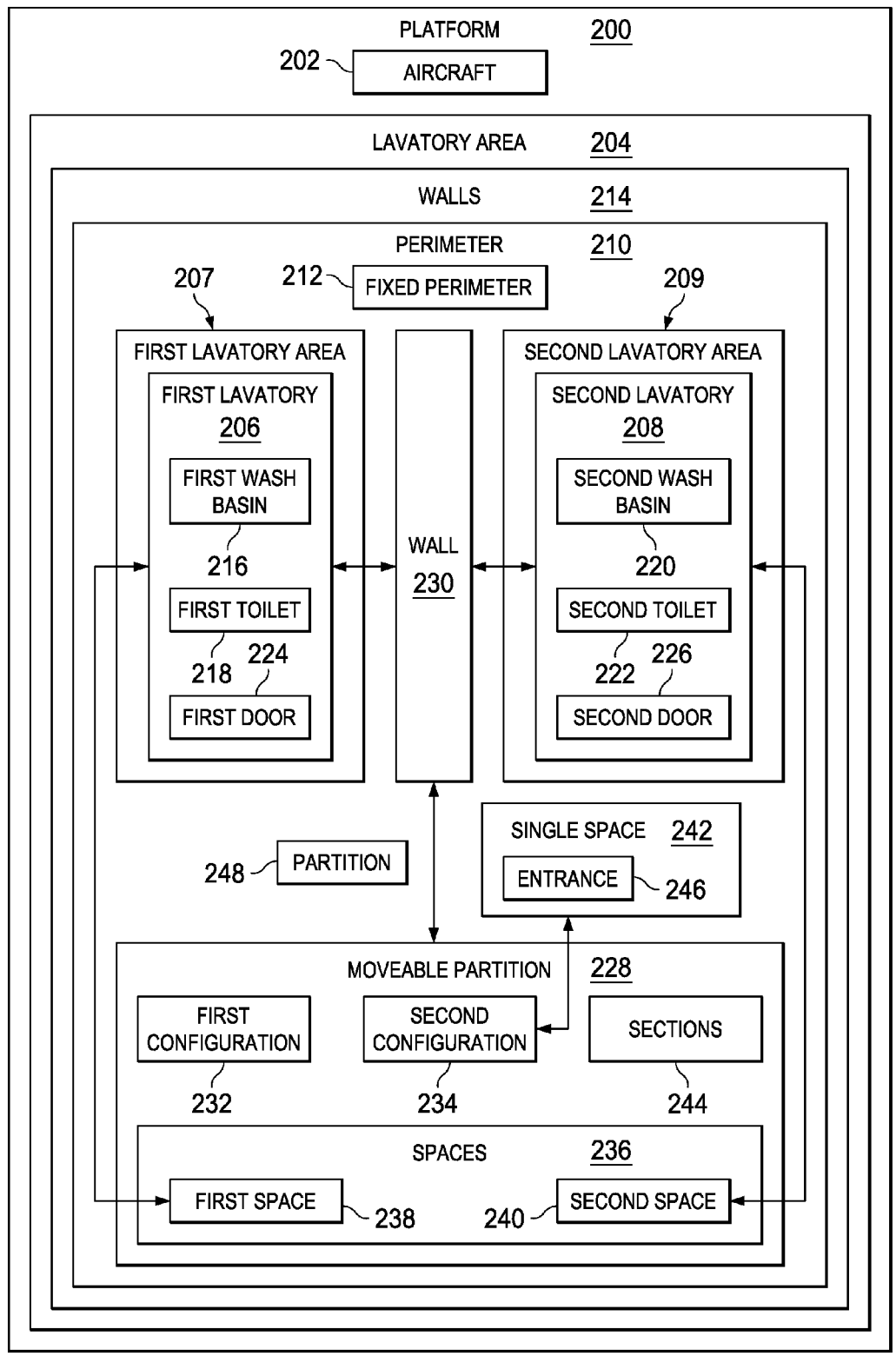
FIG. 2 is an illustration of a block diagram of a platform with a lavatory area in accordance with an illustrative embodiment.

With reference now to FIG. 2, an illustration of a block diagram of a platform with a lavatory area is depicted in accordance with an illustrative embodiment. In this depicted example, platform 200 may be aircraft 202. Aircraft 100 in FIG. 1 is an example of one physical implementation for aircraft 202 shown in block form in this figure.

As depicted, platform 200 includes lavatory area 204. Lavatory area 204 is an area within platform 200 in which first lavatory 206 and second lavatory 208 may be located. First lavatory 206 is located in first lavatory area 207 and second lavatory 208 is located in second lavatory area 209. In this illustrative example, first lavatory 206 in first lavatory area 207 and second lavatory 208 in second lavatory area 209 are adjacent to each other.

Perimeter 210 is a boundary around first lavatory 206 and second lavatory 208. In this illustrative example, perimeter 210 takes the form of fixed perimeter 212 that extends around first lavatory 206 and second lavatory 208. As depicted, perimeter 210 is fixed perimeter 212 because walls 214 forming perimeter 210 around first lavatory 206 and second lavatory 208 are fixed and do not move into other areas within lavatory area 204 or other areas within platform 200.

In this illustrative example, first lavatory 206 includes first wash basin 216 and first toilet 218. Second lavatory 208 includes second wash basin 220 and second toilet 222. Additionally, first lavatory 206 has first door 224 and second lavatory 208 has second door 226 located within walls 214.

As depicted, moveable partition 228 is present in lavatory area 204 and forms at least part of wall 230 between first lavatory 206 and second lavatory 208. In particular, moveable partition 228 is configured for use with first lavatory 206 and second lavatory 208. Moveable partition 228 is a structure that may be used to reconfigure space for first lavatory 206 and second lavatory 208 within walls 214.

Moveable partition 228 may be comprised of different types of materials. For example, moveable partition 228 may be comprised of a composite material, a metal, or some other suitable type of material.

Moveable partition 228 may have first configuration 232 and second configuration 234. In particular, moveable partition 228 may be moved between first configuration 232 and second configuration 234.

In these illustrative examples, when moveable partition 228 is in first configuration 232, moveable partition 228 forms at least a portion of wall 230. In first configuration 232, moveable partition 228 is configured to separate first lavatory 206 and second lavatory 208 into spaces 236. Spaces 236 are separate spaces for first lavatory 206 and second lavatory 208 within fixed perimeter 212 when moveable partition 228 is in first configuration 232. In particular, spaces 236 include first space 238 and second space 240. First space 238 is space within first lavatory 206 within perimeter 210. Second space 240 is space within second lavatory 208 within perimeter 210.

When moveable partition 228 is in second configuration 234, moveable partition 228 defines single space 242 for first lavatory 206 and second lavatory 208 instead of spaces 236. Single space 242 may provide additional room for passengers such as a family, a handicapped passenger, or other types of passengers who may require additional room within lavatory area 204.

As depicted, moveable partition 228 may be comprised of sections 244. Sections 244 are configured to fold relative to each other in this illustrative example. The configuration of sections 244 and the manner in which they fold relative to each other may be selected such that undesired contact with structures within lavatory area 204 may be reduced or avoided when sections 244 are folded to move moveable partition 228 between first configuration 232 and second configuration 234. For example, folding of sections 244 for moveable partition 228 may occur such that undesired contact with first wash basin 216 is avoided. Undesired contact may be, for example, any contact that results in inconsistencies in moveable partition 228, structures in lavatory area 204, or both. In these illustrative examples, folding of sections 244 involves rotational movement of one or more sections 244.

In the illustrative examples, first door 224 and second door 226 are configured to form entrance 246 for single space 242. Entrance 246 is without partition 248 between first door 224 and second door 226 when moveable partition 228 is in second configuration 234.

In particular, first door 224 is for first lavatory area 207 and second door 226 is for second lavatory area 209. As depicted, first door 224 and second door 226 are configured to move between an open position and a closed position. In the illustrative example, entrance 246 is a single passageway that is present in both the first lavatory area 207 and second lavatory area 209 when first door 224 and second door 226 are in the open position. The single passageway is present in this example, when moveable partition is in second configuration 234.

Partition 248 is present when moveable partition 228 is in first configuration 232 in the illustrative example. In particular, moveable partition 228 may form partition 248 between first door 224 and second door 226 when moveable partition 228 is in first configuration 232 and divides lavatory area 204 into first space 238 in first lavatory 206 and second space 240 in second lavatory 208.

The illustration of platform 200 and lavatory area 204 in platform 200 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although platform 200 has been described as being implemented as aircraft 202, platform 200 may be implemented in other forms. Platform 200 may be, for example, a mobile platform, a stationary platform, a land-based structure, an aquatic-based structure, or a space-based structure. More specifically, platform 200 may be a surface ship, a train, a spacecraft, a space station, a submarine, a power plant, a house, an office building, a manufacturing facility, a building, a theatre, or other suitable platforms.

In another illustrative example, a third lavatory may be adjacent to one of first lavatory 206 and second lavatory 208. The common wall between the third lavatory and the other lavatory may also be formed using another moveable partition similar to moveable partition 228. In other illustrative examples, both common walls of the middle lavatory may be moveable partitions such that an even larger space is available if desired.

As another illustrative example, although lavatory area 204 has been described as defining first lavatory 206 and second lavatory 208 with walls 214 with perimeter 210 within fixed perimeter 212, perimeter 210 may not be fixed in other illustrative examples.

Figure 3:
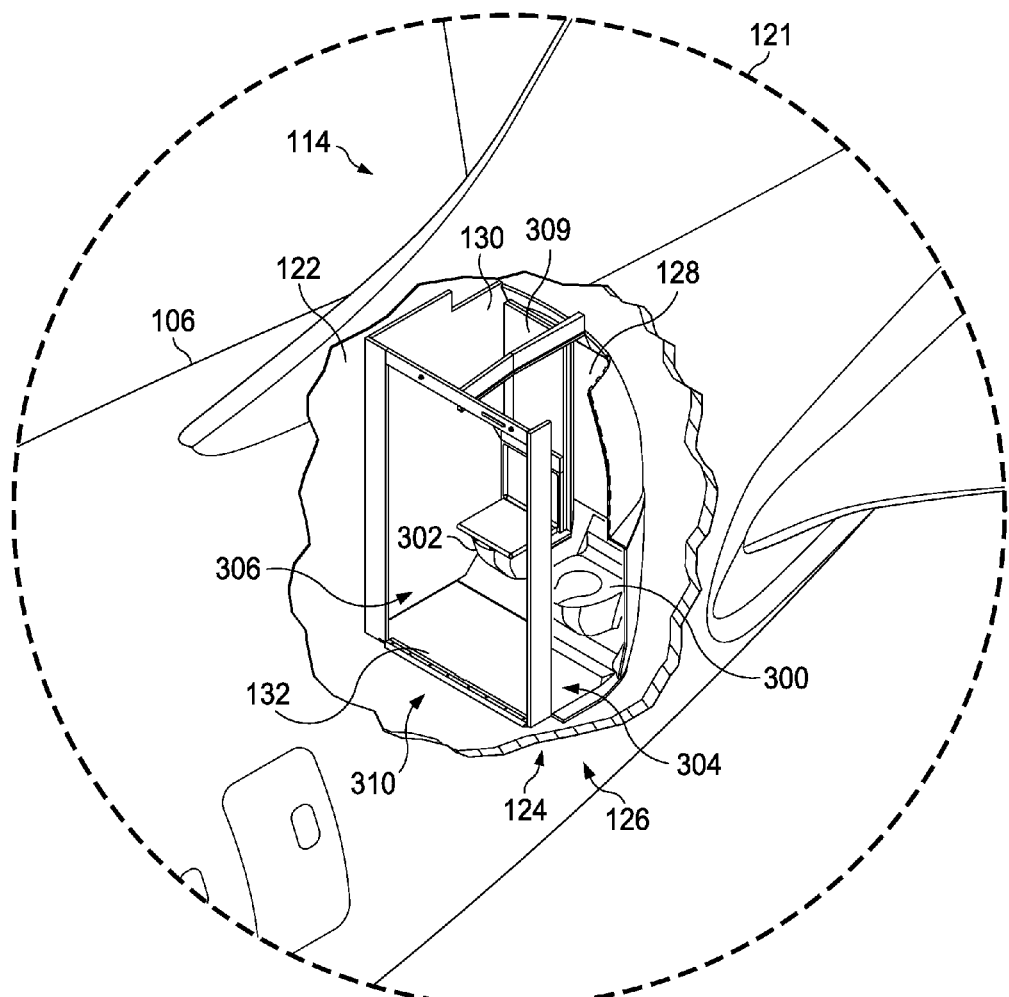
FIG. 3 is an illustration of a lavatory area in an aircraft in accordance with an illustrative embodiment.

With reference now to FIG. 3, an illustration of a lavatory area in an aircraft is depicted in accordance with an illustrative embodiment. In this depicted example, a more detailed illustration of section 121 in fuselage 106 of aircraft 100 from FIG. 1 is shown. Some components for first lavatory 128 and second lavatory 130 can be seen in this exposed view of lavatory area 126. In particular, first lavatory 128 and second lavatory 130 are examples of physical implementations for first lavatory 206 and second lavatory 208 in FIG. 2.

As depicted, first lavatory 128 includes first toilet 300 and second lavatory 130 includes second toilet 302. As can be seen in this illustrative example, first space 304 and second space 306 are located within perimeter 132. First space 304 and second space 306 are defined by perimeter 132.

In these illustrative examples, instead of placing a wall to divide lavatory area 126 into first space 304 and second space 306, moveable partition 309 is used. As depicted, moveable partition 309 is shown in a second configuration. Moveable partition 309 is an example of an implementation for moveable partition 228 shown in block form in FIG. 2. With the use of an illustrative embodiment, first space 304 and second space 306 within perimeter 132 may be combined to form single space 310 as depicted in this figure.

Figure 4:
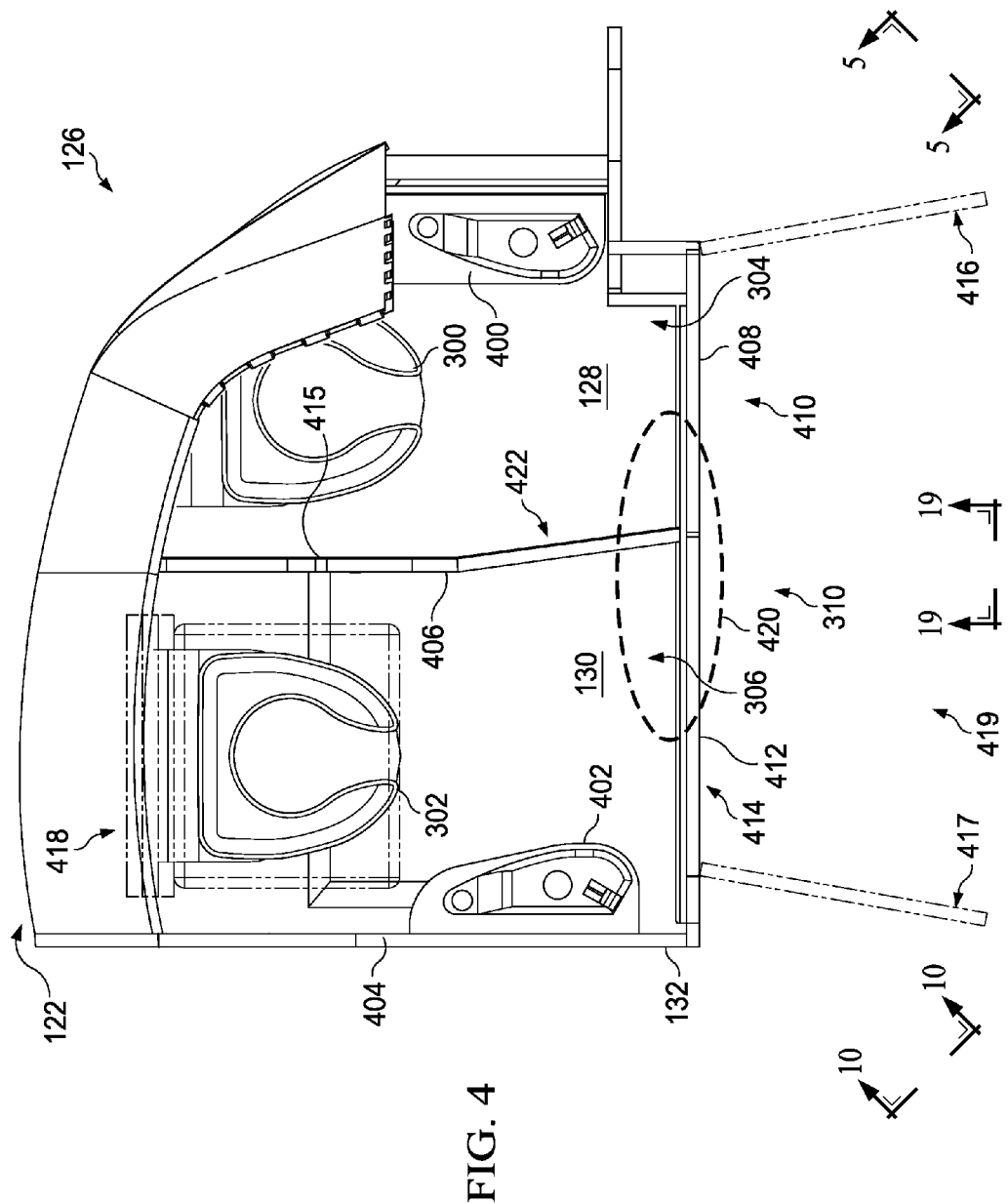
FIG. 4 is an illustration of a plan view of a first lavatory and a second lavatory in a lavatory area in accordance with an illustrative embodiment.

With reference now to FIG. 4, an illustration of a plan view of a first lavatory and a second lavatory in a lavatory area is depicted in accordance with an illustrative embodiment. A plan view of first lavatory 128 and second lavatory 130 is shown in this figure.

In this view, first wash basin 400 is shown in first lavatory 128. Additionally, second wash basin 402 is shown in second lavatory 130.

As can be seen in this plan view, walls 404 define perimeter 132. Perimeter 132 defines first space 304 for first lavatory 128 and second space 306 for second lavatory 130. In this illustrative example, first space 304 and second space 306 may be defined within perimeter 132 by moveable partition 406.

As depicted, first door 408 is a first door for first lavatory 128. First door 408 is located in first opening 410 in walls 404.

Second door 412 is a door for second lavatory 130. Second door 412 is located in second opening 414 in walls 404.

In this illustrative example, first door 408 and second door 412 are shown as closed. Each door may be individually opened to provide access to one of the lavatories when moveable partition 406 is in first configuration 415. For example, when first door 408 (shown in phantom) is in open position 416, a passenger may enter first lavatory 128 through first opening 410. As another example, when second door 412 (shown in phantom) is in open position 417, a passenger may enter second lavatory 130 through second opening 414.

When moveable partition 406 is in second configuration 418, first door 408 and second door 412 may both be opened to form single entrance 419. Single entrance 419 is an entrance without an obstruction such as a column that forms a partition between first opening 410 and second opening 414. A more detailed illustration of this feature is found in section 420, which is described in more detail below.

As depicted, moveable partition 406 is comprised of sections 422. In these illustrative examples, these sections are configured to fold relative to each other when moveable partition 406 moves between a first configuration and a second configuration. These sections may also be referred to as foldable sections in the illustrative example. The configuration of sections 422 is designed such that sections 422 for moveable partition 406 fold in a manner that avoids undesired contact with structures in first lavatory 128 and second lavatory 130.

As depicted, moveable partition 406 is shown in first configuration 415. In first configuration 415, moveable partition 406 separates first lavatory 128 and second lavatory 130 into separate spaces such as first space 304 and second space 306.

Additionally, moveable partition 406 also may be placed into second configuration 418. Second configuration 418 is shown in phantom in this illustrative example. When moveable partition 406 is in second configuration 418, single space 310 is present within perimeter 132. In this manner, additional space may be provided for passengers who may desire or may need more space than provided by first space 304 or second space 306 alone when moveable partition 406 is in first configuration 415.

FIGS. 5-9 are illustrations of a reconfiguration of space for first lavatory 128 and second lavatory 130 using moveable partition 406 in accordance with an illustrative embodiment. These figures illustrate different configurations for moveable partition 406 used to divide and combine space within first lavatory 128 and second lavatory 130. The views of these figures are isometric views seen in the direction of lines 5-5 in FIG. 4.

Figure 5:
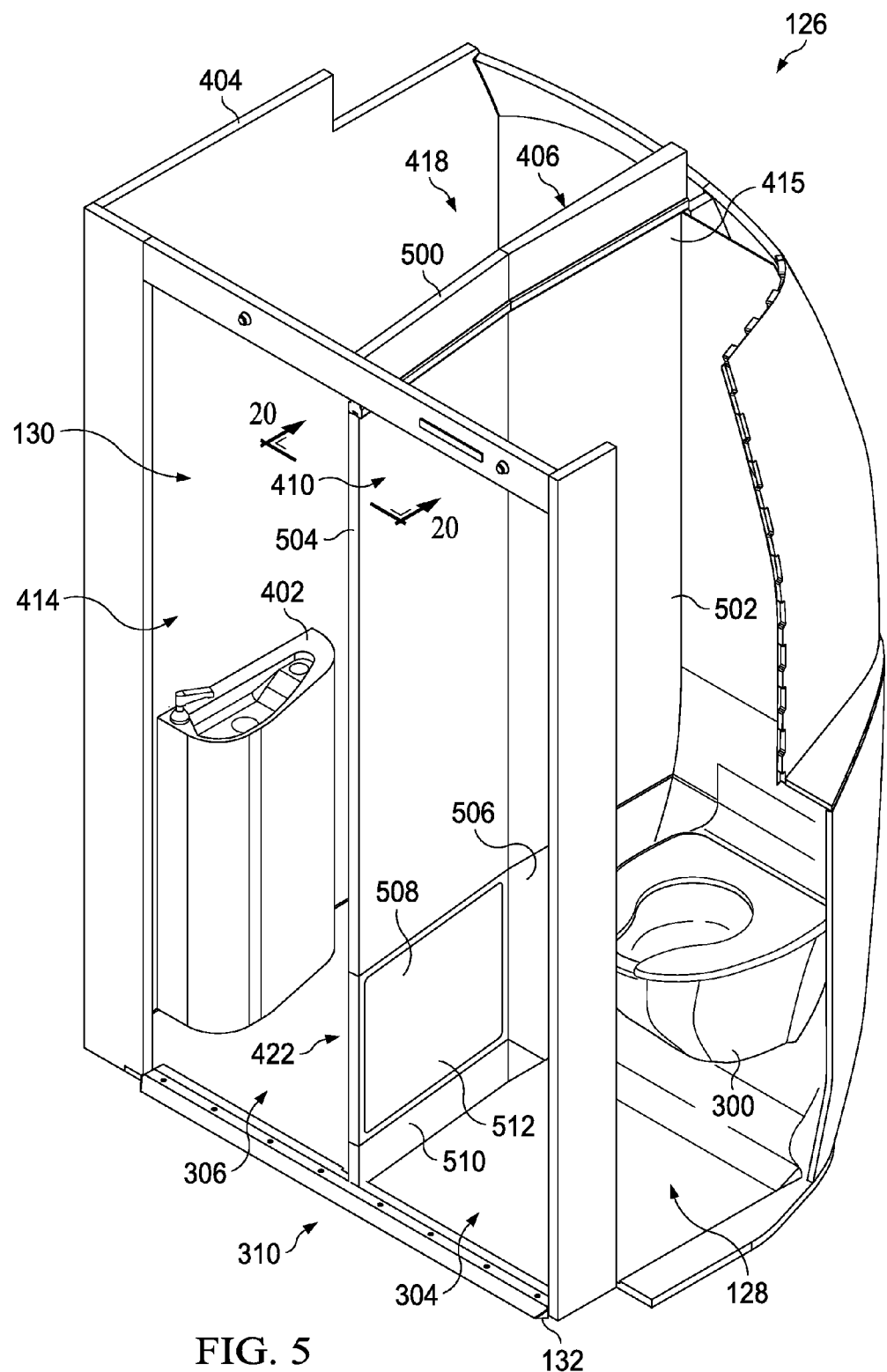
FIG. 5 is an illustration of an isometric view of a first lavatory and a second lavatory in a lavatory area in accordance with an illustrative embodiment.

Turning first to FIG. 5, an illustration of an isometric view of a first lavatory and a second lavatory in a lavatory area is depicted in accordance with an illustrative embodiment. In this depicted example, an isometric view of lavatory area 126 with first lavatory 128 and second lavatory 130 is shown.

In this view, first door 408 and second door 412 are not shown to better illustrate the movement of moveable partition 406. Further, this isometric view is shown in an exposed view without first wash basin 400 and portions of walls 404 to more clearly illustrate the movement of moveable partition 406 from first configuration 415 to second configuration 418.

As illustrated, moveable partition 406 may be held in place, moved in place or both held in place and moved in place by guide track 500. For example, guide track 500 may aid in the movement of moveable partition 406 between first configuration 415 to second configuration 418. Additionally, guide track 500 may hold moveable partition 406 in place in first configuration 415.

In this illustrative example, sections 422 include section 502, section 504, section 506, section 508, and section 510. These sections in sections 422 may fold relative to each other when moving between first configuration 415 and second configuration 418. Additionally, section 508 also includes seat 512 which may fold outward to form a seat covering second toilet 302 (not shown in this view) when moveable partition 406 is in second configuration 418.

Figure 6:
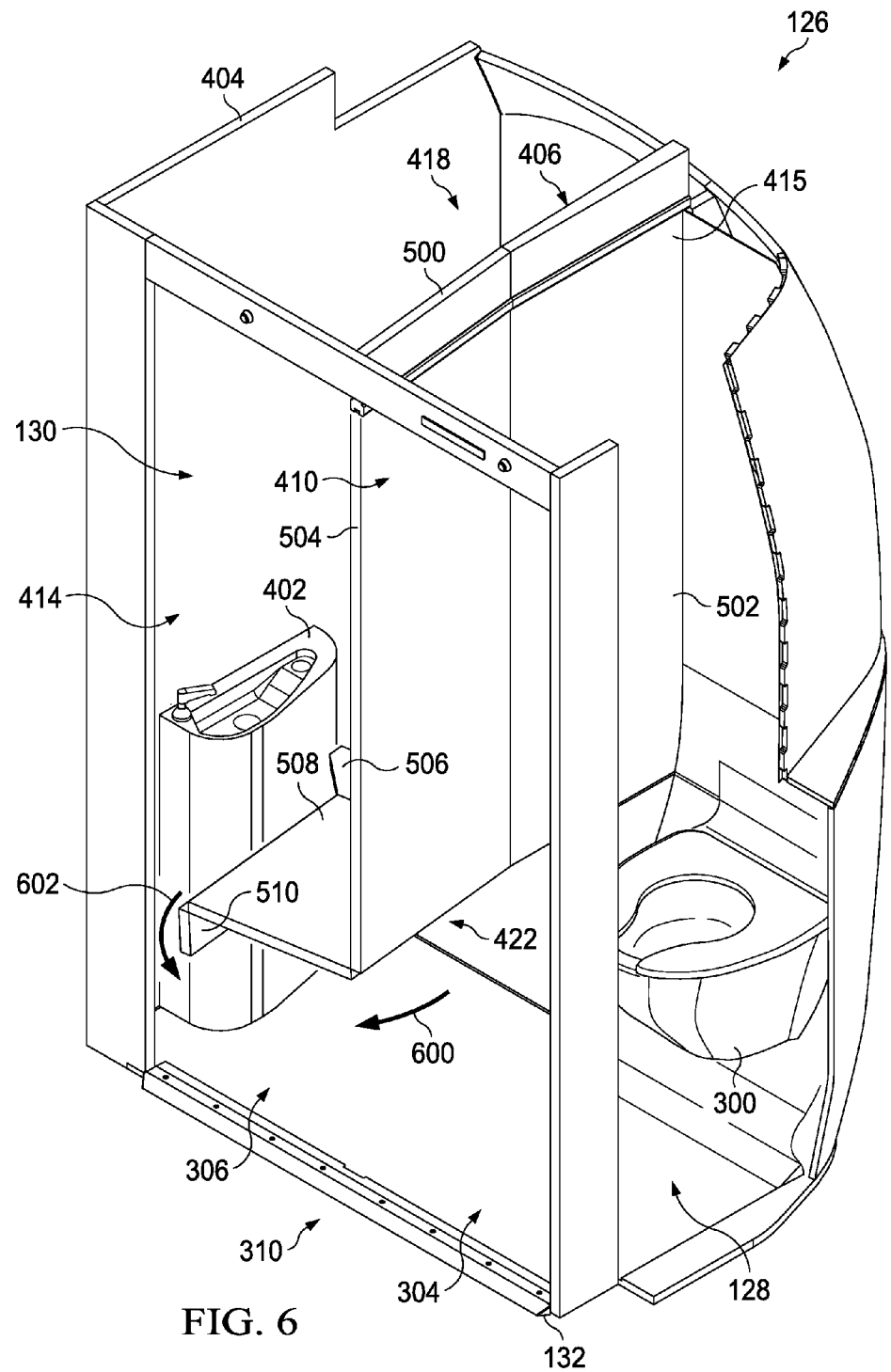
FIG. 6 is an illustration of movement of a moveable partition in accordance with an illustrative embodiment.

Turning now to FIG. 6, an illustration of movement of a moveable partition is depicted in accordance with an illustrative embodiment. In this illustration, moveable partition 406 begins moving out of first configuration 415.

In this illustrative example, section 506, section 508, and section 510 fold relative to each other when moveable partition 406 is moved out of first configuration 415 towards second configuration 418. As can be seen, this folding of section 506, section 508, and section 510 may be performed to avoid undesired contact with structures in second lavatory 130.

For example, section 510 and section 508 may rotate in the direction of arrow 600 and fold such that section 510 may rotate in the direction of arrow 602 relative to section 504. This type of folding may result in moveable partition 406 avoiding undesired contact with second wash basin 402.

Figure 7:
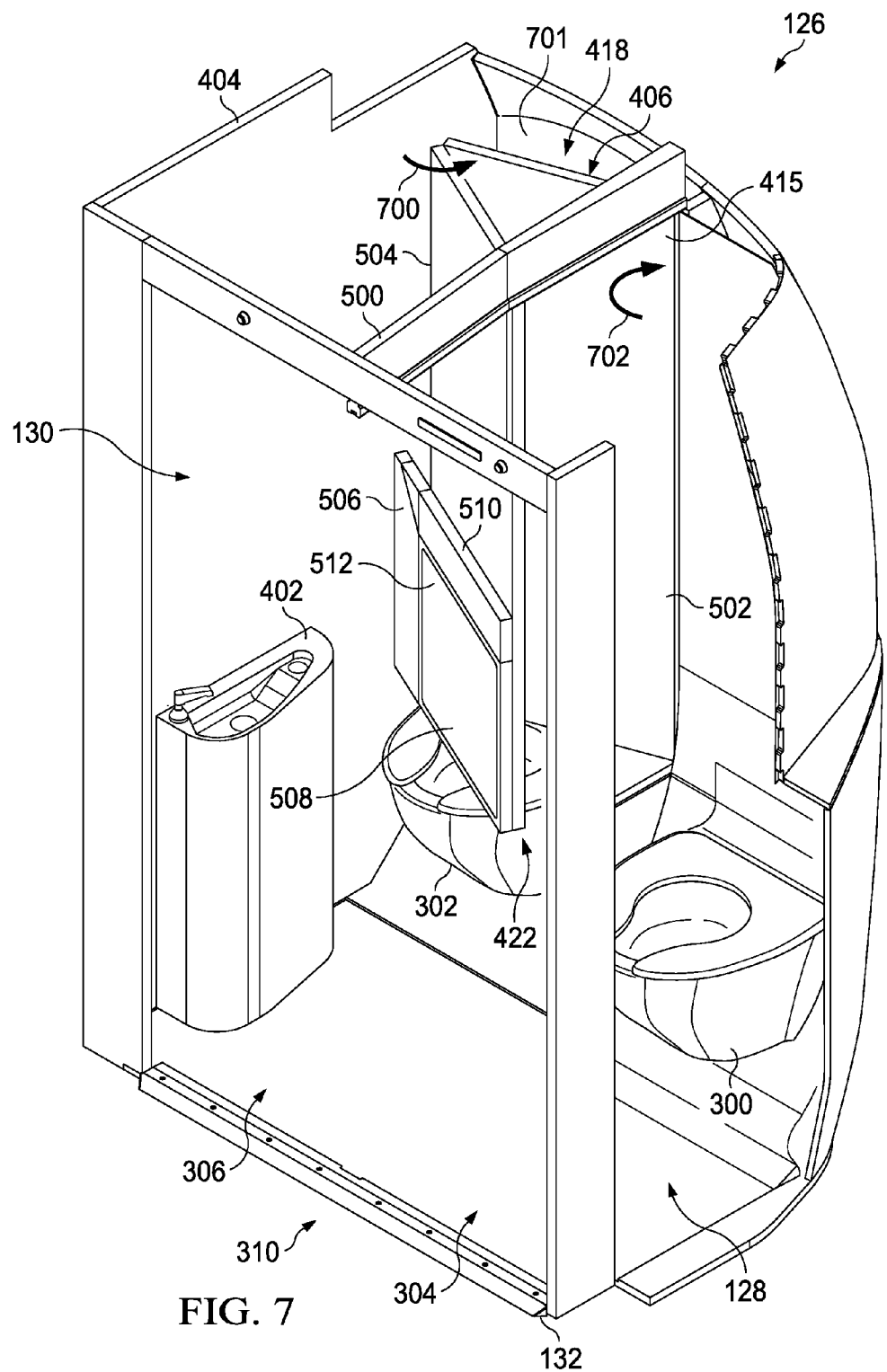
FIG. 7 is an illustration of movement of a moveable partition in accordance with an illustrative embodiment.

Turning now to FIG. 7, an illustration of movement of a moveable partition is depicted in accordance with an illustrative embodiment. As depicted, section 506, section 508, and section 510 have been folded against section 504. In this illustrative example, the movement of moveable partition 406 results in first space 304 and second space 306 forming single space 310.

Further, section 504 is shown folded in the direction of arrow 700 relative to section 502. Additionally, section 502 is shown folded towards back wall 701 in walls 404 in the direction of arrow 702. In these illustrative examples, folding involves rotational movement of one or more sections.

Figure 8:
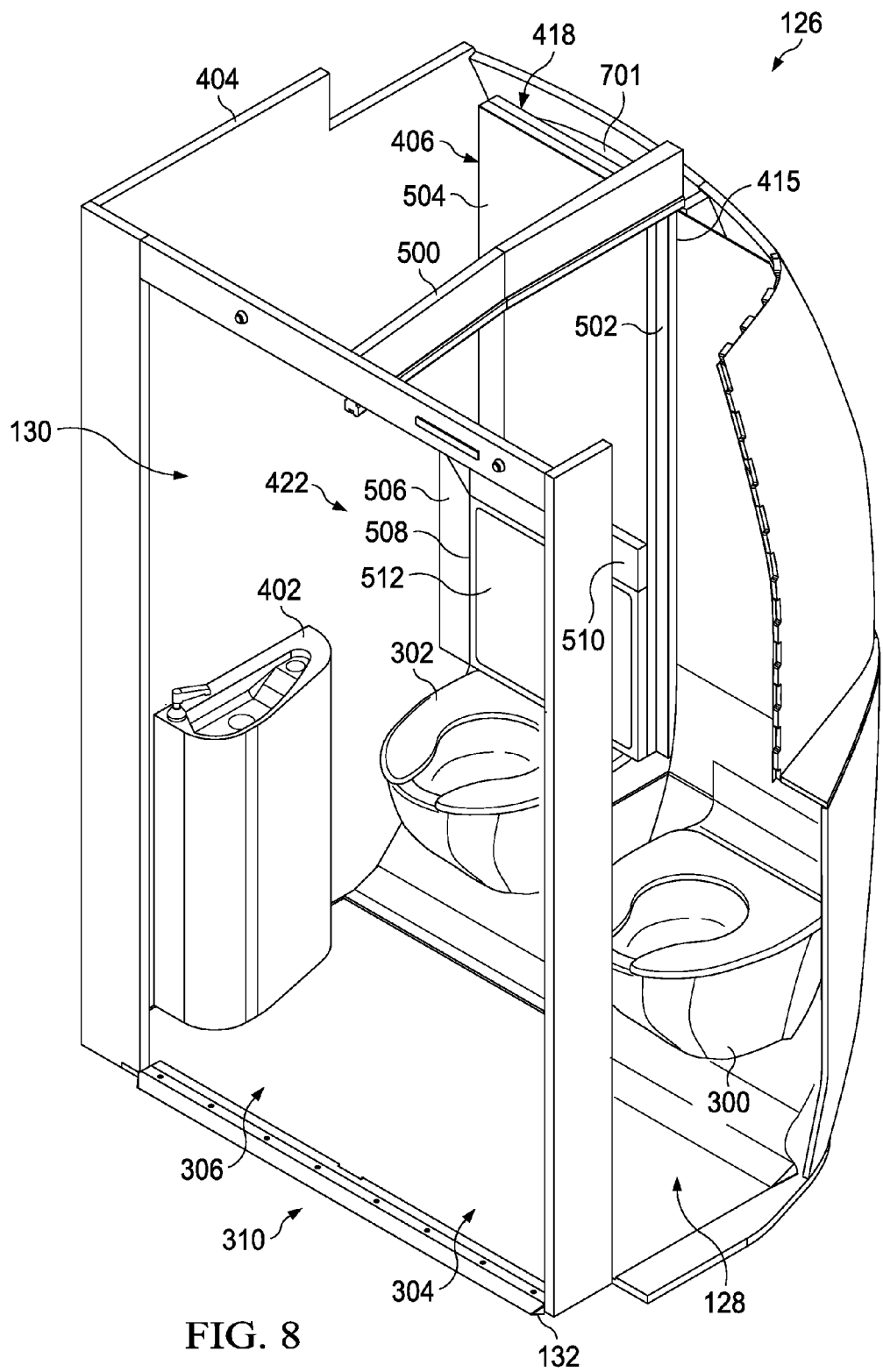
FIG. 8 is an illustration of a moveable partition in accordance with an illustrative embodiment.

With reference now to FIG. 8, an illustration of a moveable partition is depicted in accordance with an illustrative embodiment. In this illustrative example, sections 422 have been folded into second configuration 418. In this configuration, single space 310 is now defined in first lavatory 128 and second lavatory 130. In other words, both of these lavatories may form a single lavatory with single space 310 in lavatory area 126.

Figure 9:
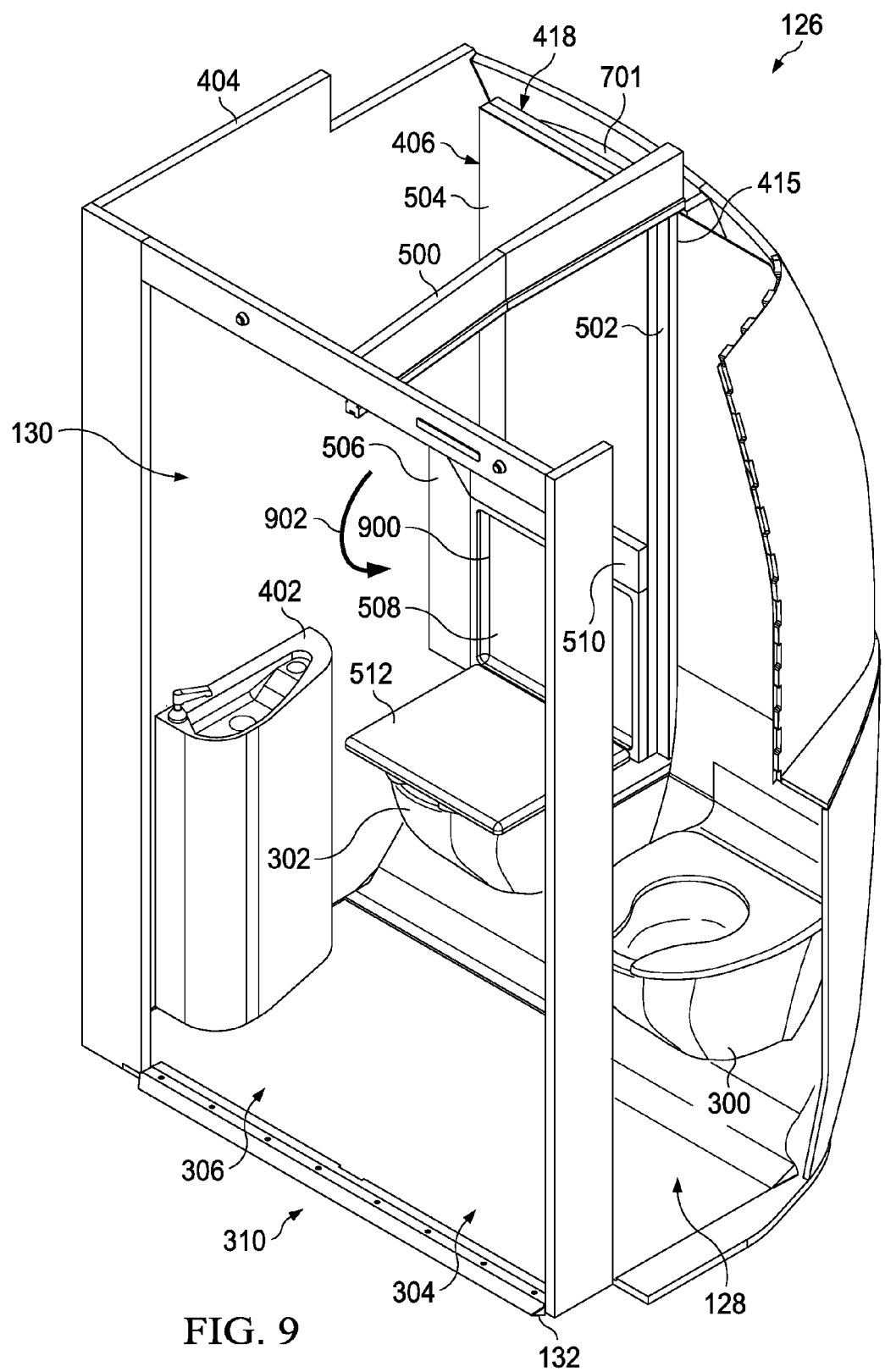
FIG. 9 is an illustration of a seat for a lavatory area in accordance with an illustrative embodiment.

Turning now to FIG. 9, an illustration of a seat for a lavatory area is depicted in accordance with an illustrative embodiment. In this illustrative example, seat 512 has been folded down from recess 900 in section 508 in the direction of arrow 902. In this manner, seat 512 may provide for extra seating or a transfer station for use of first toilet 300.

FIGS. 10-14 are illustrations of a reconfiguration of space for first lavatory 128 and second lavatory 130 using moveable partition 406 in accordance with an illustrative embodiment. These figures illustrate movement of moveable partition 406 form a different perspective as compared to those in FIGS. 5-9. The views of these figures are isometric views seen in the direction of lines 10-10 in FIG. 4.

In these views, portions of walls 404, first door 408, and second door 412, as well as other structures, such as second wash basin 402, are not shown in this exposed view to more clearly illustrate the movement of moveable partition 406 between first configuration 415 and second configuration 418.

Figure 10:
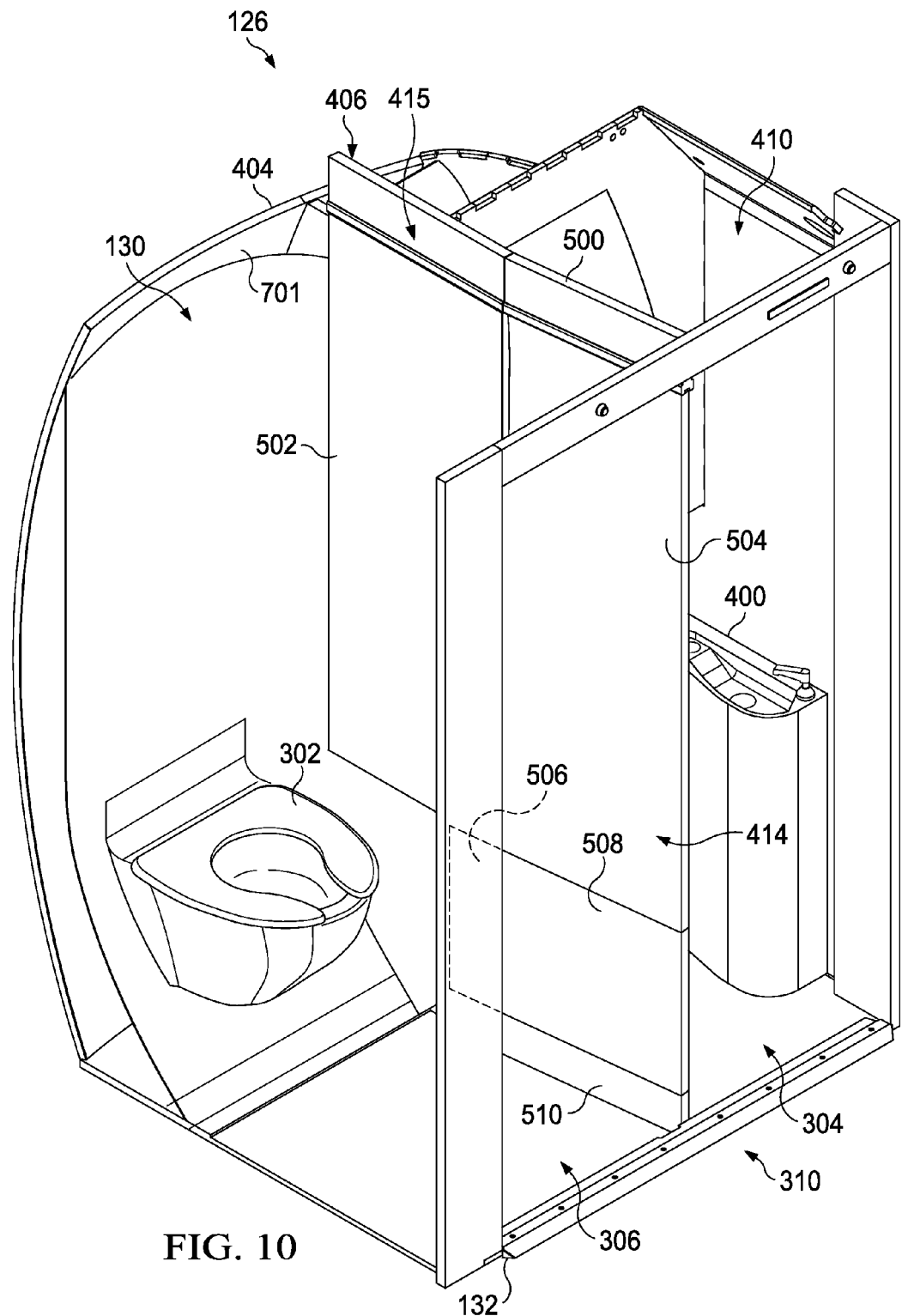
FIG. 10 is an illustration of a moveable partition in a first configuration in accordance with an illustrative embodiment.

Turning first to FIG. 10, an illustration of a moveable partition in a first configuration is depicted in accordance with an illustrative embodiment. FIG. 10 is another view of moveable partition 406 as shown in FIG. 5. In this illustration, moveable partition 406 is shown in first configuration 415.

Figure 11:
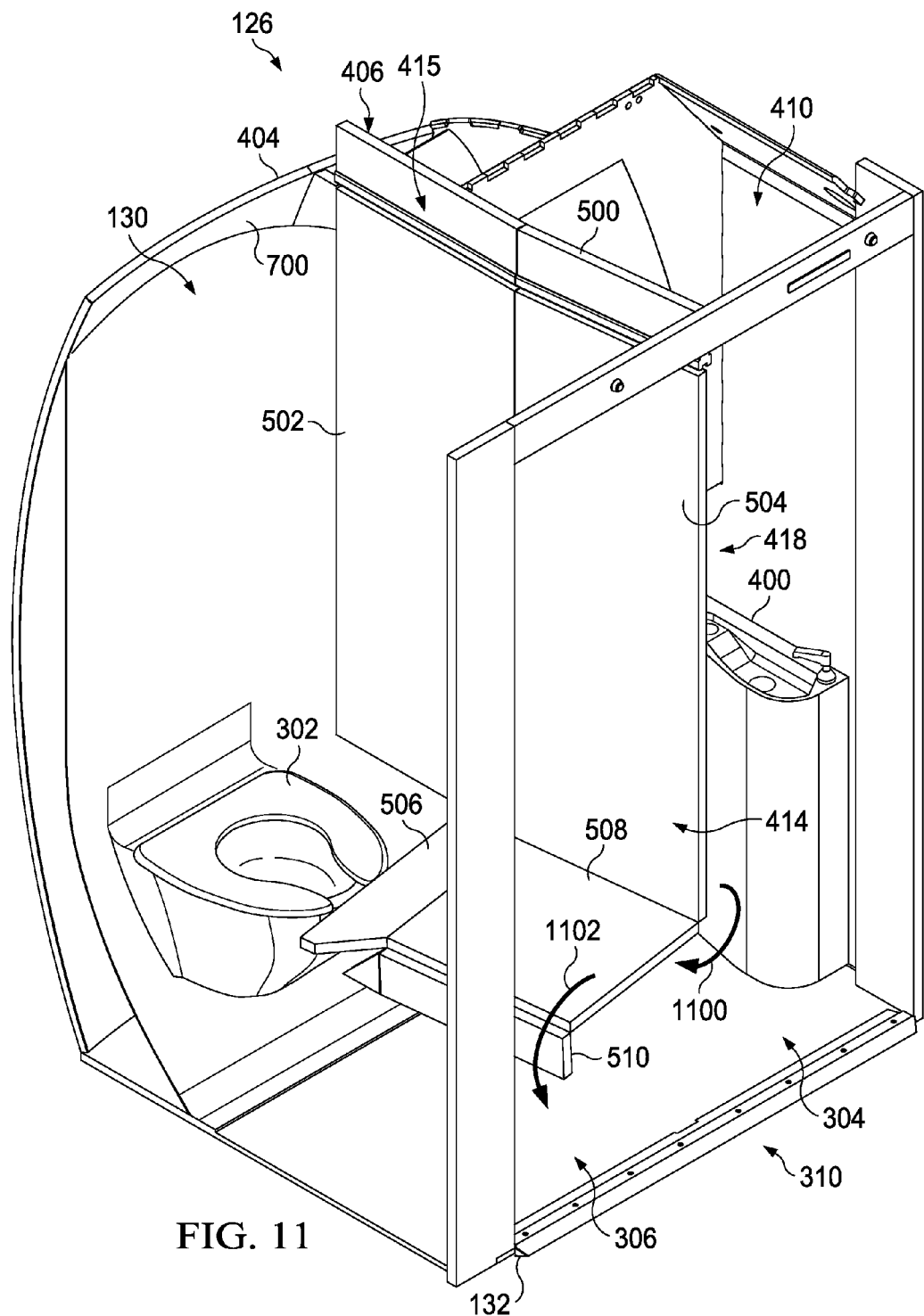
FIG. 11 is an illustration of movement of a moveable partition in accordance with an illustrative embodiment.

In FIG. 11, an illustration of movement of a moveable partition is depicted in accordance with an illustrative embodiment. FIG. 11 is another view of the movement of moveable partition 406 as shown in FIG. 6.

In this illustrative example, section 508 has been folded in direction of arrow 1100, and section 510 has been folded in the direction of arrow 1102. This folding of section 508 and section 510 may avoid undesired contact with structures in second space 306 in second lavatory 130. For example, undesired contact with second wash basin 402 (not shown) may be avoided.

Figure 12:
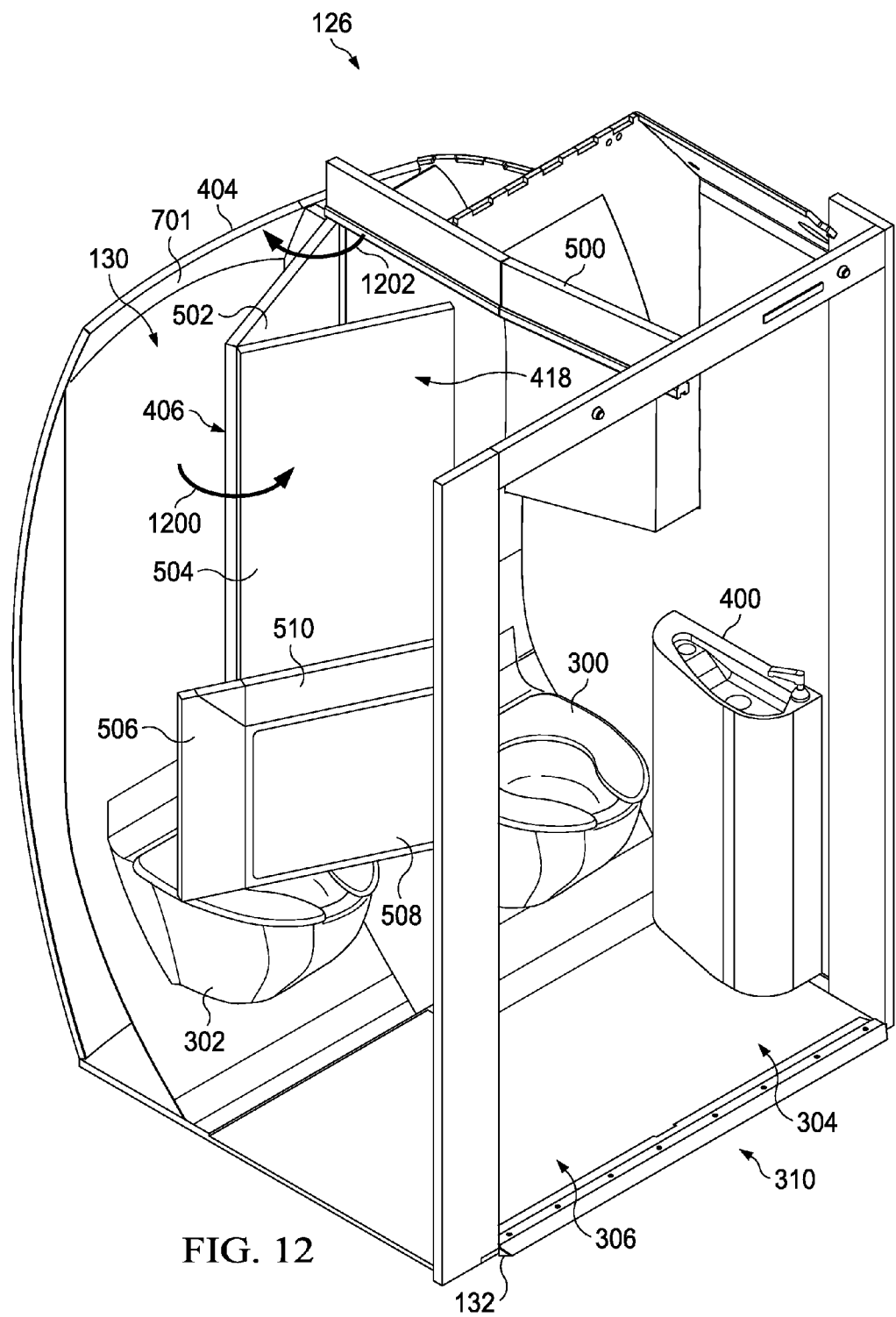
FIG. 12 is an illustration of movement of a moveable partition in accordance with an illustrative embodiment.

With reference now to FIG. 12, an illustration of movement of a moveable partition is depicted in accordance with an illustrative embodiment. FIG. 12 is another view of the movement of moveable partition 406 as depicted in FIG. 7. In this illustrative example, the movement of moveable partition 406 results in first space 304 and second space 306 forming single space 310.

As depicted, section 504 has been folded in the direction of arrow 1200 relative to section 502. Section 502 has been folded in the direction of arrow 1202 towards back wall 701 in walls 404. Additionally, section 506, section 508, and section 510 are now shown folded against section 504 in this illustrative example.

Figure 13:
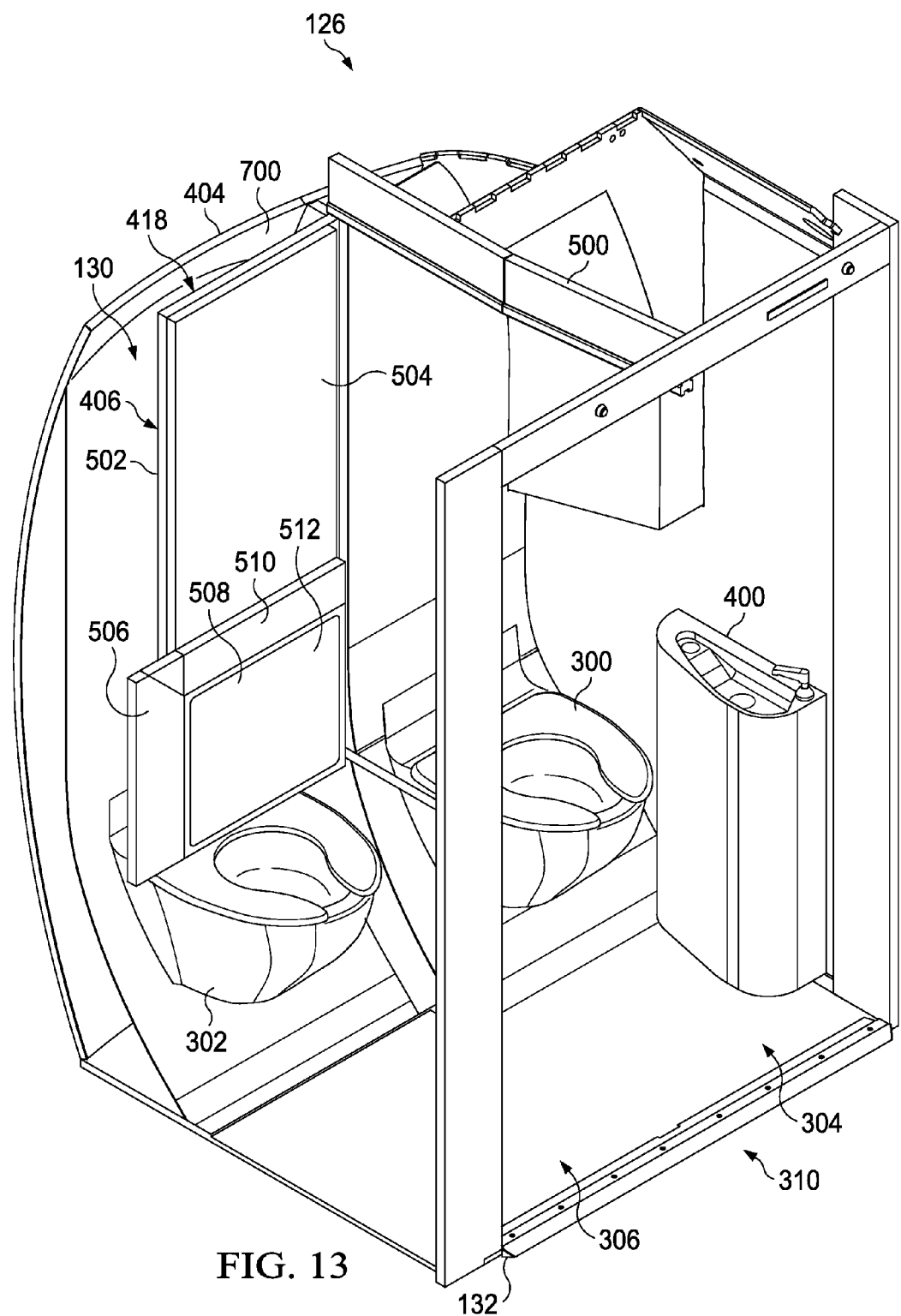
FIG. 13 is an illustration of a moveable partition in a second configuration in accordance with an illustrative embodiment.

Turning now to FIG. 13, an illustration of a moveable partition in a second configuration is depicted in accordance with an illustrative embodiment. FIG. 13 is another view of moveable partition 406 in second configuration 418 as depicted in FIG. 8.

As can be seen in this example, moveable partition 406 is now in second configuration 418. In this configuration, single space 310 is now present in lavatory area 126. Single space 310 is a combination of first space 304 and second space 306.

Figure 14:
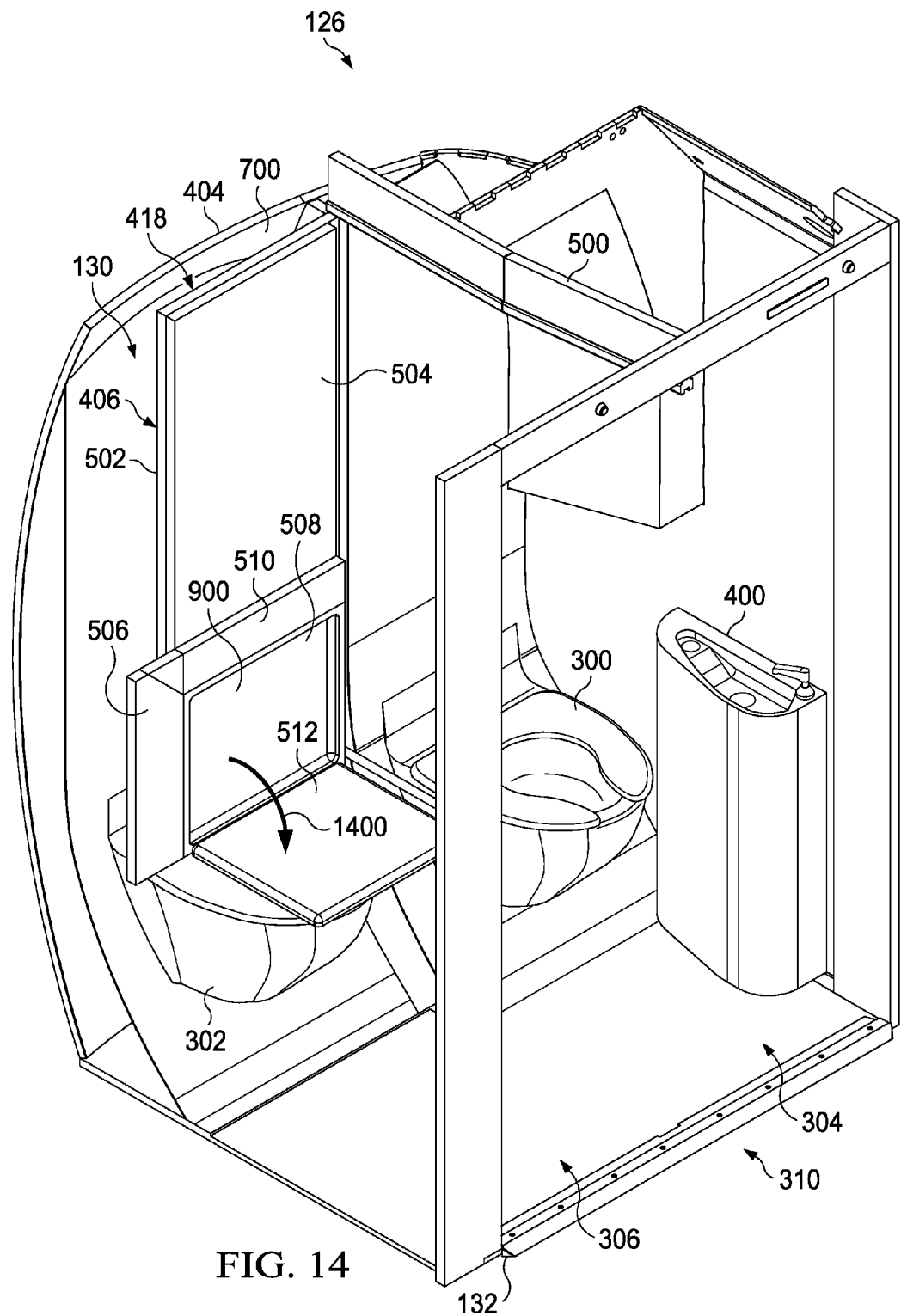
FIG. 14 is an illustration of a seat for a lavatory area in accordance with an illustrative embodiment.

Turning now to FIG. 14, an illustration of a seat for a lavatory area is depicted in accordance with an illustrative embodiment. FIG. 14 is another view of seat 512 as shown in FIG. 9.

In this illustrative example, seat 512 has been folded down from recess 900 in section 508 in the direction of arrow 1400. In this manner, seat 512 may provide for extra seating or a transfer station for use of first toilet 300.

Figure 15:
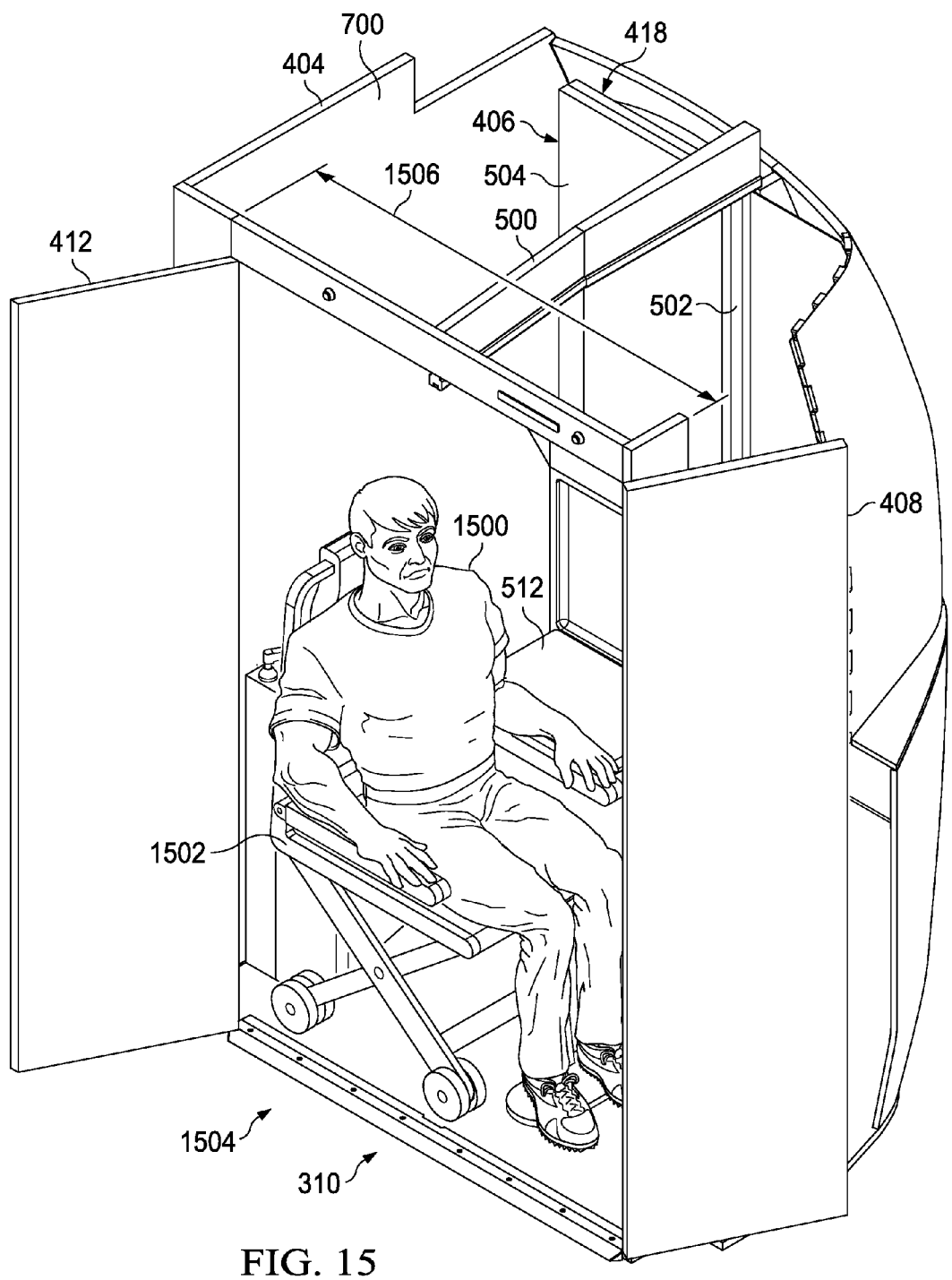
FIG. 15 is an illustration of a first lavatory and a second lavatory in a lavatory area reconfigured for use with a single space in accordance with an illustrative embodiment.

Turning now to FIG. 15, an illustration of a first lavatory and a second lavatory in a lavatory area reconfigured for use with a single space is depicted in accordance with an illustrative embodiment. In this illustrative example, first lavatory 128 and second lavatory 130 are configured to provide single space 310 within perimeter 132 for passenger 1500 located in wheelchair 1502.

In this illustrative example, single space 310 is now present with moveable partition 406 in second configuration 418. As can be seen in this illustration, seat 512 located over second toilet 302 may provide a transfer station for passenger 1500 to reach first toilet 300 within single space 310.

Also shown in this configuration, first door 408 and second door 412 are configured to open to form entrance 1504 for access to single space 310. Entrance 1504 is without a partition located between first door 408 and second door 412. The partition may be a column, wall, or other structure that normally separates first door 408 and second door 412 when first door 408 and second door 412 are in a closed position. This partition may be an obstruction for passengers who need more space to enter lavatory area 126.

In this manner, entrance 1504 without a partition has width 1506. Width 1506 provides more space for passenger 1500 in wheelchair 1502 to enter single space 310.

Figure 16:
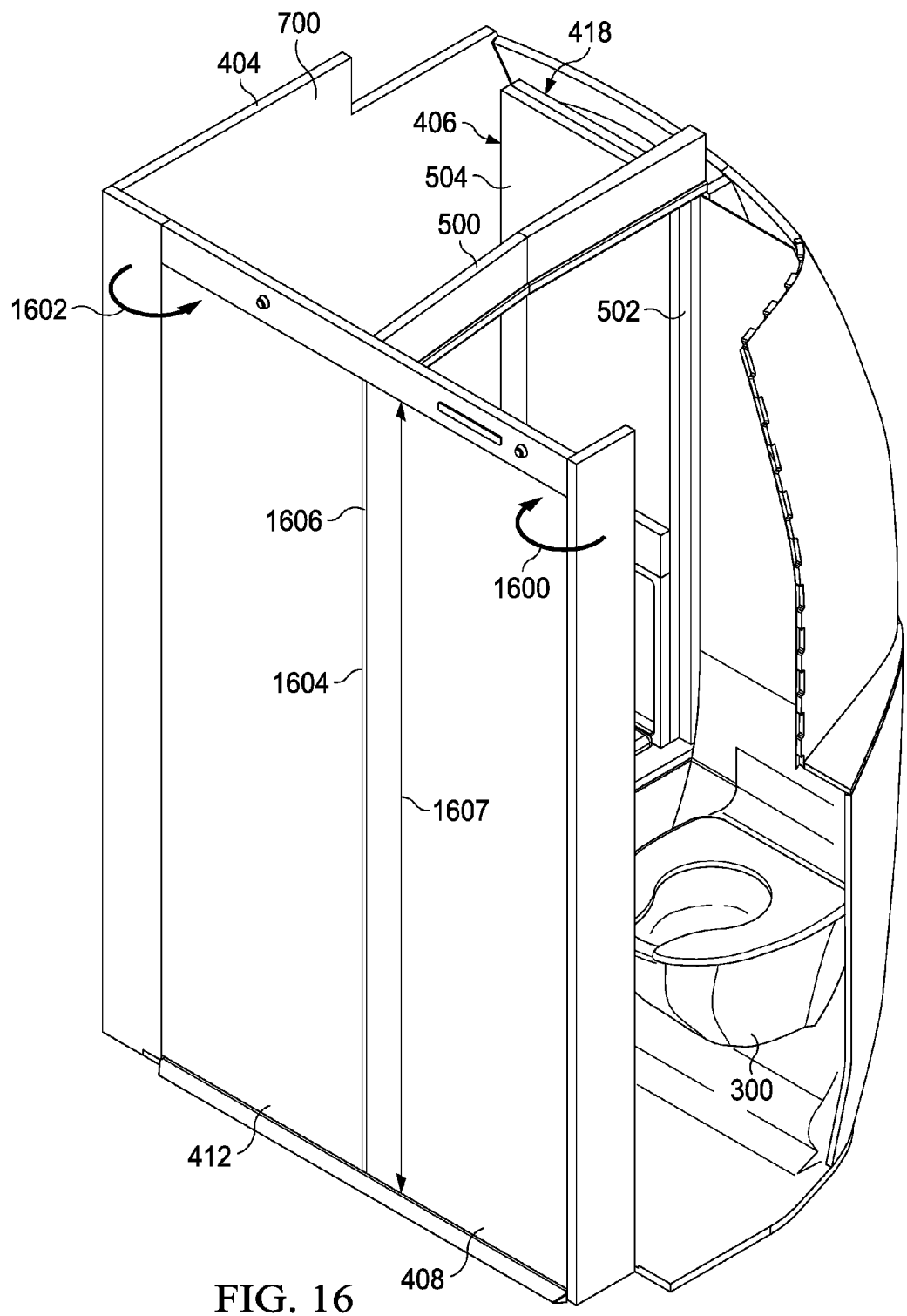
FIG. 16 is an illustration of doors in a closed position with a lavatory area in a second configuration in accordance with an illustrative embodiment.

Turning now to FIG. 16, an illustration of doors in a closed position with a lavatory area in a second configuration is depicted in accordance with an illustrative embodiment. In this illustrative example, first door 408 and second door 412 have been moved in the direction of arrow 1600 and arrow 1602, respectively.

As can be seen, moveable structure 1604 blocks gap 1606 between first door 408 and second door 412 when first door 408 and second door 412 are in a closed position. Normally, gap 1606 is filled by moveable partition 406 when moveable structure 1604 is in first configuration 415.

In this illustrative example, moveable structure 1604 may be comprised of various materials. For example, moveable structure 1604 may be comprised of at least one of a rigid plastic, metal, a composite material, aluminum, steel, or some other suitable type of material. Moveable structure 1604 may have a shape such as a beam, an "I" shape, a "U" shape, or some other suitable shape that may have length 1607. As depicted, length 1607 may be about the height of first door 1408.

In second configuration 418, moveable structure 1604 may be moved in place to fill gap 1606. Additionally, moveable structure 1604 also may be configured to lock first door 408 and second door 412 when first door 408 and second door 412 are closed and moveable structure 1604 has been moved to fill gap 1606.

Figure 17:
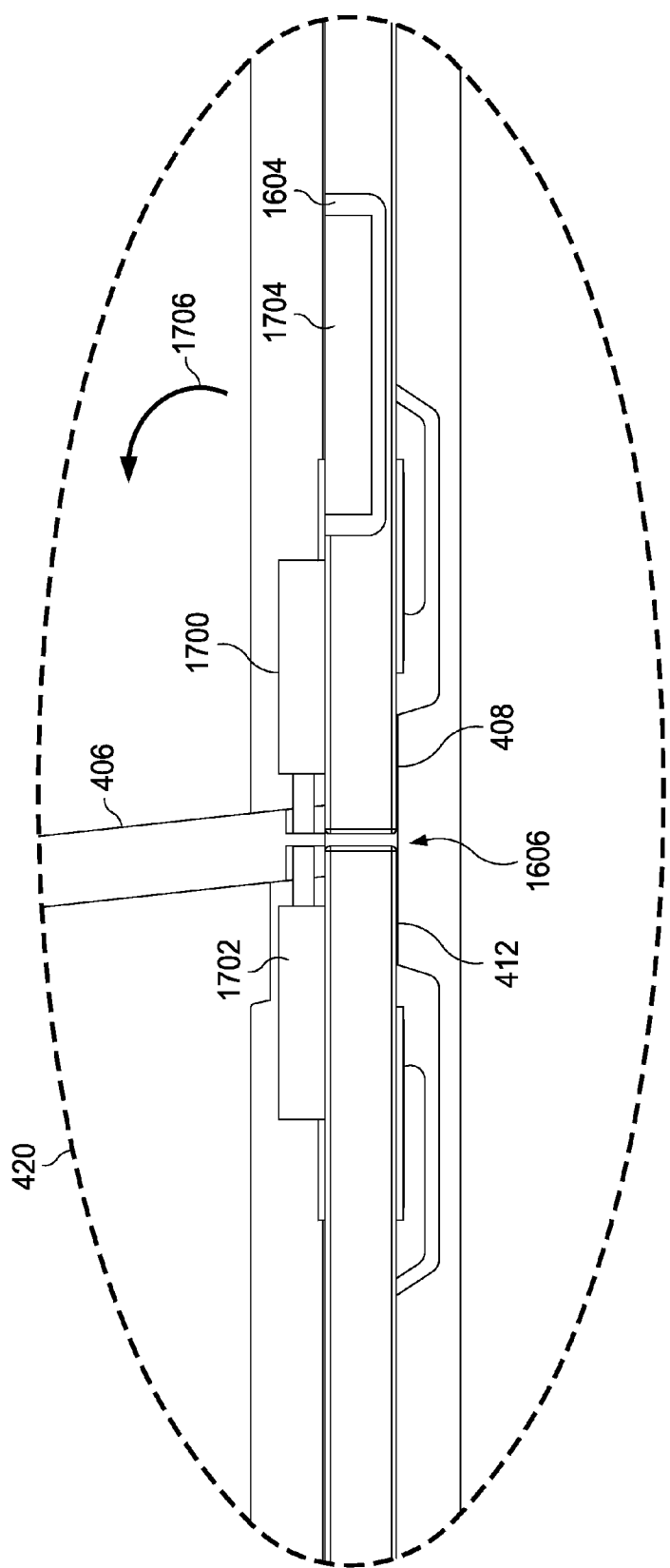
FIG. 17 is an illustration of a moveable partition in a first configuration relative to a first door and a second door in accordance with an illustrative embodiment.

Turning now to FIG. 17, an illustration of a moveable partition in a first configuration relative to a first door and a second door is depicted in accordance with an illustrative embodiment. In this illustrative example, a plan view of section 420 is shown in more detail in this figure.

As depicted, moveable partition 406 is in first configuration 415. In this view, moveable partition 406 blocks gap 1606 when first door 408 and second door 412 are closed. Additionally, latch 1700 is configured to hold first door 408 in a closed position and may lock first door 408 in the closed position. Latch 1702 is configured to hold second door 412 in a closed position and also may lock second door 412 in the closed position.

In this view, moveable structure 1604 is shown within recess 1704 in first door 408. Moveable structure 1604 may be rotated in the direction of arrow 1706 to cover gap 1606 when moveable partition 406 is in second configuration 418. In the illustrative example, moveable structure 1604 may be secured or locked in place within recess 1704 when not in use in first configuration 415.

Figure 18:
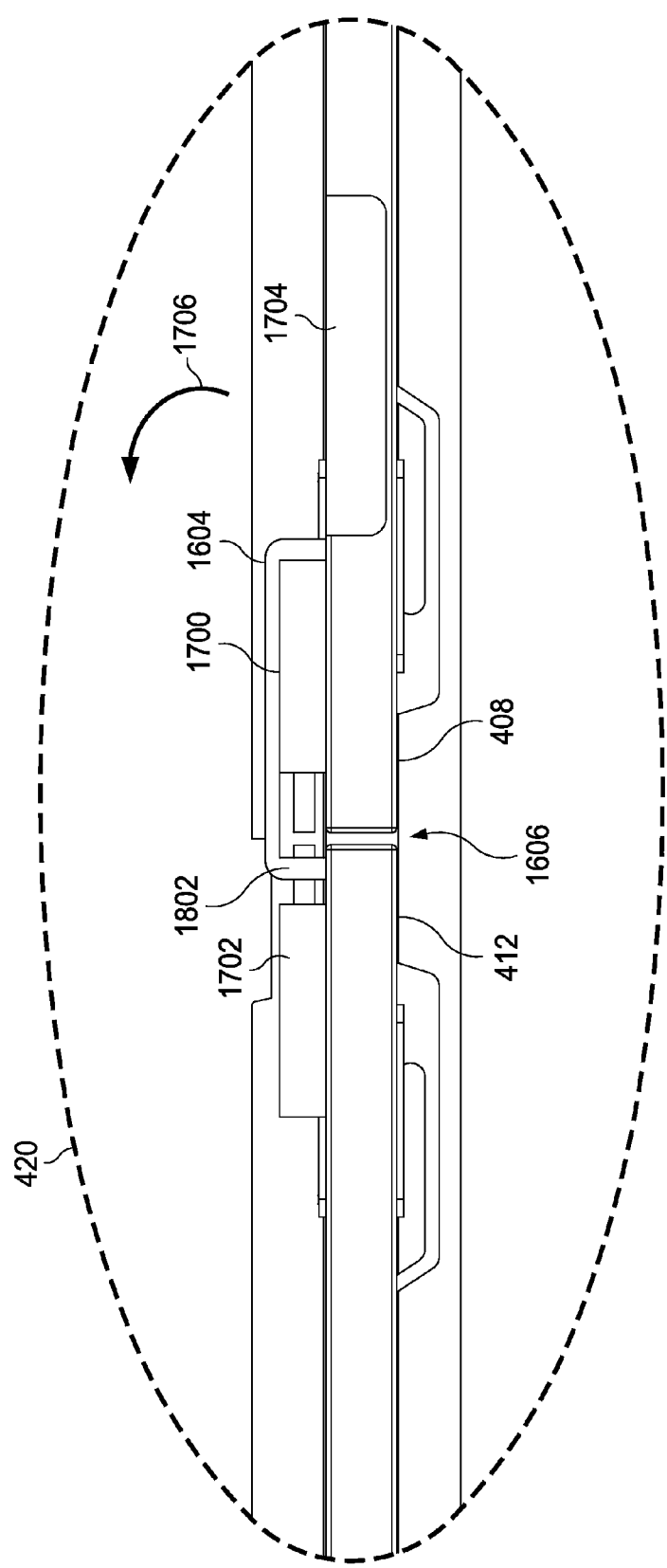
FIG. 18 is an illustration of a moveable partition in a second configuration relative to a first door and a second door in accordance with an illustrative embodiment.

Turning now to FIG. 18, an illustration of a moveable partition in a second configuration relative to a first door and a second door is depicted in accordance with an illustrative embodiment. Moveable partition 406 has been moved against back wall 701 (not shown) into second configuration 418. As can be seen, this movement into second configuration 418 for moveable partition 406 results in the folding of sections 422 relative to each other. In this view, moveable structure 1604 has been rotated in the direction of arrow 1706.

Moveable structure 1604 may be rotated into this position when first door 408 and second door 412 are in a closed position. As can be seen, gap 1606 is blocked or filled by moveable structure 1604. Additionally, flange 1802 of moveable structure 1604 may engage latch 1702 on second door 412. This engagement with latch 1702 may lock first door 408 and second door 412 in the closed position. Additionally, moveable structure 1604 may be locked into at least one of first door 408, the lavatory ceiling, or the lavatory floor in this illustrative example.

Figure 19:
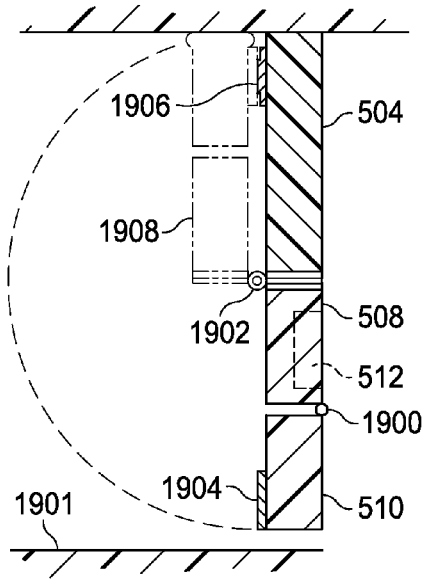
FIG. 19 is an illustration of a portion of a moveable partition in accordance with an illustrative embodiment.

With reference now to FIG. 19, an illustration of a portion of a moveable partition is depicted in accordance with an illustrative embodiment. In this example, a portion of moveable partition 406 is shown from a view in the direction of lines 19-19 in FIG. 4.

As can be seen in this view, section 508 is shown near floor 1901 of lavatory area 126. As depicted, section 508 and section 510 are connected to each other by hinge 1900. Section 508 and section 504 are connected to each other by hinge 1902. In these illustrative examples, these hinges may be piano hinges or some other suitable type of connecting mechanisms that allow for rotational movement to fold these sections relative to each other.

Additionally, section 510 has magnet 1904 and section 504 has magnet 1906. These two magnets allow for section 508 and section 510 to be placed into folded position 1908 as shown with section 508 and section 510 in phantom. Of course, other types of latching mechanisms or securing mechanisms may be used to hold these sections in place when moving moveable partition 406 into second configuration 418.

Figure 20:
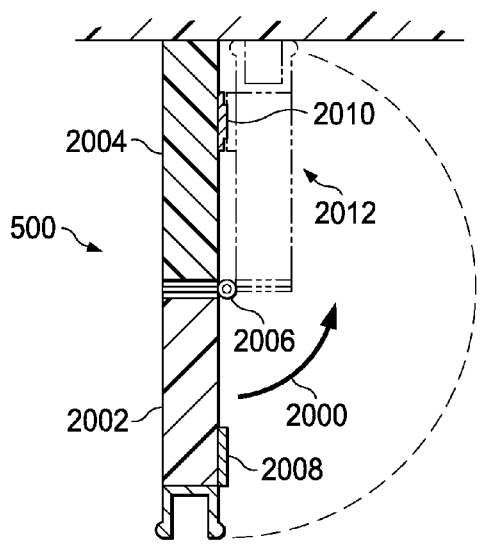
FIG. 20 is an illustration of a portion of a guide track in accordance with an illustrative embodiment.

Turning now to FIG. 20, an illustration of a portion of a guide track is depicted in accordance with an illustrative embodiment. In this example, a portion of guide track 500 is shown from a view in the direction of lines 20-20 in FIG. 5.

As can be seen in this view, guide track 500 may be folded to move in the direction of arrow 2000. This movement may provide for additional clearance for passengers within lavatory area 126. As can be seen in this view, guide track 500 includes section 2002 and section 2004. Hinge 2006 connects section 2002 to section 2004. Section 2002 may rotate in the direction of arrow 2000 to fold against section 2004.

Additionally, section 2002 has magnet 2008 and section 2004 has magnet 2010. These magnets may allow section 2002 to be held against section 2004 when in folded position 2012 as shown with section 2002 in phantom.

The illustration examples of lavatory area 126 and the different components in lavatory area 126 in FIG. 1 and FIGS. 3-20 are not meant to limit the manner in which other lavatory areas may be. These different illustrations are only provided as examples of some implementations for the host embodiment. For example, in some illustrative examples, seat 512 may be omitted from moveable partition 406. In still other illustrative examples, moveable partition 406 may have other numbers of sections and a section that folds differently from the manner in which the illustrative examples have been depicted. In still another illustrative example, sections 422 in moveable partition 406 may fold against the ceiling in lavatory area 126 instead of back wall 701.

The different components shown in FIG. 1 and FIGS. 3-20 may be combined with components in FIG. 2, used with components in FIG. 2, or a combination of the two. Additionally, some of the components in FIG. 1 and FIGS. 3-20 may be illustrative examples of how components shown in block form in FIG. 2 can be implemented as physical structures.

Figure 21:
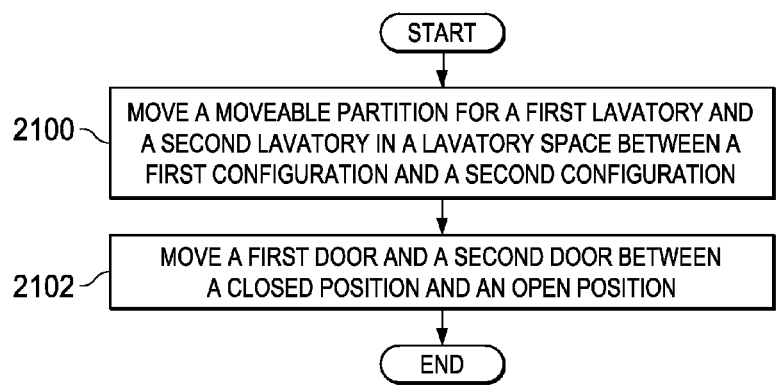
FIG. 21 is an illustration of a flowchart of a process for reconfiguring a lavatory area in accordance with an illustrative embodiment.

With reference next to FIG. 21, an illustration of a flowchart of a process for reconfiguring a lavatory area is depicted in accordance with an illustrative embodiment. The different operations illustrated in FIG. 21 may be implemented in platform 200 in FIG. 2.

The process begins by moving a moveable partition for a first lavatory and a second lavatory in a lavatory space between a first configuration and a second configuration (operation 2100). The first configuration separates the first lavatory and the second lavatory into separate spaces within a fixed perimeter for the first lavatory and the second lavatory. The second configuration has a single space present within the fixed perimeter.

A first door and a second door are moved between a closed position and an open position (operation 2102), with the process terminating thereafter. The first door and the second door are configured to open to form an entrance for the single space without a partition between the first door and the second door when the moveable partition is in the second configuration.

Illustrative embodiments of the disclosure may be described in the context of aircraft manufacturing and service method 2200 as shown in FIG. 22 and aircraft 2300 as shown in FIG. 23. Turning first to FIG. 22, an illustration of an aircraft manufacturing and service method is depicted in the form of a block diagram in accordance with an illustrative embodiment. During pre-production, aircraft manufacturing and service method 2200 may include specification and design 2202 of aircraft 2300 in FIG. 23 and material procurement 2204.

During production, component and subassembly manufacturing 2206 and system integration 2208 of aircraft 2300 in FIG. 23 takes place. Thereafter, aircraft 2300 in FIG. 23 may go through certification and delivery 2210 in order to be placed in service 2212. While in service 2212 by a customer, aircraft 2300 in FIG. 23 is scheduled for routine maintenance and service 2214, which may include modification, reconfiguration, refurbishment, and other maintenance or service.

Each of the processes of aircraft manufacturing and service method 2200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 23, an illustration of an aircraft is depicted in the form of a block diagram in which an illustrative embodiment may be implemented. In this example, aircraft 2300 is produced by aircraft manufacturing and service method 2200 in FIG. 22 and may include airframe 2302 with plurality of systems 2304 and interior 2306. Examples of systems 2304 include one or more of propulsion system 2308, electrical system 2310, hydraulic system 2312, and environmental system 2314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2200 in FIG. 22. In one illustrative example, components or subassemblies produced in component and subassembly manufacturing 2206 in FIG. 22 may be fabricated or manufactured in a manner similar to components or subassemblies produced while aircraft 2300 is in service 2212 in FIG. 22. As yet another example, one or more apparatus embodiments, method embodiments, or a combination thereof may be utilized during production stages, such as component and subassembly manufacturing 2206 and system integration 2208 in FIG. 22. One or more apparatus embodiments, method embodiments, or a combination thereof may be utilized while aircraft 2300 is in service 2212 and/or during maintenance and service 2214 in FIG. 22. The use of a number of the different illustrative embodiments may substantially expedite the assembly of and/or reduce the cost of aircraft 2300.

For example, a first lavatory and a second lavatory may be designed with a perimeter that employs a moveable partition. The different components for the first lavatory and the second lavatory with a moveable partition may be manufactured during component and subassembly manufacturing 2206. These components may be installed during system integration 2208.

Further, in some illustrative examples, an illustrative embodiment may be implemented during maintenance and service 2214. For example, a moveable partition may be installed as part of maintenance, upgrade, or refurbishment between a first lavatory and a second lavatory. Further, the aircraft may be configured such that a first lavatory and a second lavatory are adjacent to each other with a common perimeter.

Further, the illustrative embodiments may be used during in service 2212 to reconfigure a first lavatory and a second lavatory to provide a first space and a second space that are divided from each other, or a single space.

In this manner, one or more of the illustrative embodiments may provide increased flexibility and access to lavatories in an aircraft. This increased access may be provided to passengers who may need more space than provided by a standard lavatory. These passengers may be handicapped passengers, larger-sized passengers, or other passengers who may need more room that normally provided by a normal lavatory in aircraft 2300.

Further, the illustrative embodiments allow reconfiguration of a first lavatory and a second lavatory as needed during in service 2212 and, in particular, during the flight of aircraft 2300. Moreover, one or more of the illustrative embodiments provide for additional usable space when the first lavatory and the second lavatory are configured to provide a single space within the perimeter of these lavatories.

Additionally, one or more illustrative embodiments also may provide an entrance that is unobstructed by a partition. In other words, both doors in the first lavatory and second lavatory may be opened to form a single entrance that is unobstructed. In this manner, a wider entrance may be provided for passengers who may need a wider entrance than that provided by just the first lavatory or the second lavatory.

Further, as described above, the moveable partition includes a seat that may provide seating for a passenger. This type of seating may be useful for a handicapped passenger that may transfer from a wheelchair to the seat and then to the toilet. This seat also may provide additional seating for a passenger when the first lavatory and the second lavatory are reconfigured to a single lavatory for other purposes, such as a family lavatory.

Also, as described above, the moveable partition, the guide track, or both may be configured to fold in a manner that avoids undesired contact with different structures within the lavatory area. In this manner, the moveable partition may be designed for use with lavatories with various sized areas and configurations.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a first lavatory area;
   a second lavatory area;
   a first door for the first lavatory area;
   a second door for the second lavatory area, wherein the first door and the second door are configured to move between an open position and a closed position and wherein a single passageway is present in both the first lavatory area and the second lavatory area when the first door and the second door are in the open position; and
   a moveable partition configured for use with the first lavatory area and the second lavatory area, wherein the moveable partition is configured to separate the first lavatory area and the second lavatory area into separate spaces within a fixed perimeter for the first lavatory area and the second lavatory area when the moveable partition is in a first configuration, and wherein the moveable partition is configured to define a single space when the moveable partition is in a second configuration, wherein the first door and the second door are configured to open to form the single passageway for the single space when the moveable partition is in the second configuration, wherein the first lavatory area includes a first toilet and the second lavatory area includes a second toilet and wherein a seat extending from the moveable partition is located over the first toilet when the moveable partition is in the second configuration.

2. The apparatus of claim 1 further comprising:
   a moveable structure associated with the first door, wherein the moveable structure is configured to rotate relative to the second door and configured to block a gap between the first door and the second door when the first door and the second door are in the closed position.

3. The apparatus of claim 2, wherein the moveable structure is configured to lock the first door and the second door when the first door and the second door are closed.

4. The apparatus of claim 1, wherein the moveable partition is configured to fold in a manner that avoids undesired contact with structures in the first lavatory area and the second lavatory area.

5. The apparatus of claim 1, wherein the moveable partition is configured to fold against a back wall in the second configuration.

6. The apparatus of claim 1, wherein the first lavatory area and the second lavatory area are located in a platform selected from one of an aircraft, a surface ship, a submarine, a spacecraft, a space station, a theatre, a train, a manufacturing facility, a building, a power plant, a house, or an office building.

7. A method for reconfiguring lavatories, the method comprising:
   moving a first door for a first lavatory area and a second door for a second lavatory area between a closed position and an open position, wherein a single passageway is present in both the first lavatory area and the second lavatory area when the first door and the second door are in the open position; and
   folding the moveable partition to form a seat when the moveable partition is in the second configuration, wherein the first lavatory area includes a first toilet and the second lavatory area includes a second toilet and wherein the seat is located over the first toilet when the moveable partition is in the second configuration.

8. The method of claim 7 further comprising:
   moving a moveable partition for the first lavatory area and the second lavatory area between a first configuration and a second configuration, wherein the first configuration separates the first lavatory area and the second lavatory area into separate spaces within a fixed perimeter for the first lavatory area and the second lavatory area, and wherein the second configuration has a single space present within the fixed perimeter.

9. The method of claim 8, wherein the first door and the second door are configured to open to form the single passageway for the single space without a partition between the first door and the second door when the moveable partition is in the second configuration.

10. The method of claim 8, wherein the moveable partition is configured to fold in a manner that avoids undesired contact with structures in the first lavatory area and the second lavatory area.

11. The method of claim 7 further comprising:
rotating a moveable structure associated with the first door, wherein the moveable structure is configured to block a gap between the first door and the second door when the first door and the second door are closed.

12. The method of claim 11 further comprising:
locking the first door and the second door with the moveable structure when the moveable structure blocks the gap.

13. A method of operating an aircraft, the method comprising:
operating the aircraft in which a first lavatory and a second lavatory are located in the aircraft with a moveable partition configured for use with the first lavatory and the second lavatory, wherein the moveable partition is configured to separate the first lavatory and the second lavatory into separate spaces within a fixed perimeter for the first lavatory and the second lavatory when the moveable partition is in a first configuration, and wherein the moveable partition is configured to define a single space within the fixed perimeter when the moveable partition is in a second configuration and in which a first door for the first lavatory and a second door for the second lavatory are configured to open to form an entrance for the single space without a partition between the first door and the second door when the moveable partition is in the second configuration that; and
folding the moveable partition to form a seat when the moveable partition is in the second configuration.

14. The method of claim 13 further comprising:
rotating a moveable structure associated with the first door relative to the first door, wherein the moveable structure is configured to block a gap between the first door and the second door when the first door and the second door are closed.

15. The method of claim 13, wherein a moveable structure associated with the first door is configured to rotate relative to the second door, block a gap between the first door and the second door when the first door and the second door are closed, and lock the first door and the second door when the first door and the second door are closed.

* * * * *